United States Patent
Zhang

(10) Patent No.: US 12,437,690 B2
(45) Date of Patent: Oct. 7, 2025

(54) DRIVING MODULE, DISPLAY PANEL AND DISPLAY DEVICE

(71) Applicants: MIANYANG BOE OPTOELECTRONICS TECHNOLOGY CO., LTD., Sichuan (CN); BOE TECHNOLOGY GROUP CO., LTD., Beijing (CN)

(72) Inventor: Lin Zhang, Beijing (CN)

(73) Assignees: MIANYANG BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/026,786

(22) PCT Filed: May 19, 2022

(86) PCT No.: PCT/CN2022/093892
§ 371 (c)(1),
(2) Date: Mar. 16, 2023

(87) PCT Pub. No.: WO2023/221042
PCT Pub. Date: Nov. 23, 2023

(65) Prior Publication Data
US 2024/0321161 A1     Sep. 26, 2024

(51) Int. Cl.
*G09G 3/20* (2006.01)
*G09G 3/3225* (2016.01)
*G09G 3/3258* (2016.01)

(52) U.S. Cl.
CPC ....... *G09G 3/20* (2013.01); *G09G 2300/0426* (2013.01); *G09G 2300/0842* (2013.01); *G09G 2310/0281* (2013.01); *G09G 2310/08* (2013.01)

(58) Field of Classification Search
CPC .................................................. G09G 3/3266
See application file for complete search history.

(56) References Cited

U.S. PATENT DOCUMENTS 8,054,257 B2    11/2011    Kwak et al.
10,783,832 B2    9/2020    Shin et al.
(Continued)

FOREIGN PATENT DOCUMENTS

CN    102354066 B    5/2015
CN    109935212 A    6/2019
(Continued)

OTHER PUBLICATIONS

SID 2019 Digest "Study of AMOLED short-term image sticking mechanism and improvement" Wei Qin, et. al., 4 Pages.

*Primary Examiner* — Sepehr Azari
(74) *Attorney, Agent, or Firm* — BROOKS KUSHMAN P.C.

(57) ABSTRACT

A driving module includes a first driving circuit and a first conversion circuit; n is a positive integer; the first driving circuit includes a plurality of stages of first driving sub-circuits; the first conversion circuit includes a plurality of first conversion sub-circuits; an nth stage of first driving sub-circuit outputs an nth stage of first driving signal; an (n−1)th stage of first driving sub-circuit outputs an (n−1)th stage of first driving signal; the nth first conversion sub-circuit is configured to control the nth stage of second driving signal output terminal to output the nth stage of second driving signal under the control of the (n−1)th stage of first driving signal and the nth stage of first driving signal according to the first voltage signal and the second voltage signal.

19 Claims, 17 Drawing Sheets

(56) References Cited

U.S. PATENT DOCUMENTS

| | | | |
|---|---|---|---|
| 2006/0156121 A1* | 7/2006 | Chung | G09G 3/3233 |
| | | | 714/726 |
| 2007/0262929 A1* | 11/2007 | Kim | G09G 3/006 |
| | | | 345/76 |
| 2008/0062112 A1 | 3/2008 | Umezaki | |
| 2010/0188381 A1* | 7/2010 | Jang | G09G 3/3266 |
| | | | 345/76 |
| 2014/0098017 A1* | 4/2014 | Murakami | G11C 19/28 |
| | | | 345/100 |
| 2015/0015554 A1* | 1/2015 | Kim | G09G 3/3266 |
| | | | 345/208 |
| 2016/0133184 A1 | 5/2016 | Gupta et al. | |
| 2017/0316731 A1 | 11/2017 | Cho et al. | |
| 2017/0323593 A1* | 11/2017 | Kim | G09G 3/2092 |
| 2018/0144717 A1 | 5/2018 | Kim et al. | |
| 2019/0164491 A1 | 5/2019 | Kim et al. | |
| 2019/0378462 A1* | 12/2019 | Chung | G11C 19/28 |
| 2020/0027404 A1 | 1/2020 | Li | |
| 2021/0020137 A1 | 1/2021 | Jang et al. | |
| 2021/0125568 A1 | 4/2021 | Yuan et al. | |
| 2021/0134202 A1 | 5/2021 | Zhang et al. | |
| 2021/0201752 A1 | 7/2021 | Feng et al. | |
| 2021/0201810 A1 | 7/2021 | Feng et al. | |
| 2022/0189404 A1 | 6/2022 | Hu | |
| 2022/0375395 A1 | 11/2022 | Zhao et al. | |

FOREIGN PATENT DOCUMENTS

| | | |
|---|---|---|
| CN | 110619840 A | 12/2019 |
| CN | 110718193 A | 1/2020 |
| CN | 111524486 A | 8/2020 |
| CN | 114023264 A | 2/2022 |
| JP | 2012008224 A | 1/2012 |
| KR | 101768544 B1 | 8/2017 |
| WO | 2013069560 A1 | 5/2013 |
| WO | 2021223743 A1 | 11/2021 |
| WO | 2021248614 A1 | 12/2021 |

\* cited by examiner

DRIVING MODULE, DISPLAY PANEL AND DISPLAY DEVICE

CROSS-REFERENCE TO RELATED APPLICATION

This application is the U.S. national phase of PCT Application No. PCT/CN2022/093892 filed on May 19, 2022, which is incorporated herein by reference in its entirety.

TECHNICAL FIELD

The present disclosure relates to the field of display technology, in particular to a driving module, a display panel and a display device.

BACKGROUND

A narrow frame is an important trend in future display technologies. At present, the Gate On Array (GOA) area is one of the main obstacles for the narrow frame of the display panel. In the related art, it is necessary to provide a light emitting control signal and a driving signal for the pixel circuit arranged in the display area, and a driving module is provided in the peripheral area of the display panel, and the driving module includes a driving signal generation circuit for providing the driving signal and a light emitting control signal generation circuit for providing the light emitting control signal, the number of transistors included in the driving module is large, and the frame width occupied by the driving module is relatively large, which is not conducive to realizing a narrow frame.

SUMMARY

In one aspect, the present disclosure provides in some embodiments a driving module, includes a first driving circuit and a first conversion circuit; wherein n is a positive integer; the first driving circuit includes a plurality of stages of first driving sub-circuits; the first conversion circuit includes a plurality of first conversion sub-circuits; an nth stage of first driving sub-circuit is configured to generate and output an nth stage of first driving signal through an nth stage of first driving signal output terminal; an (n−1)th stage of first driving sub-circuit is configured to generate and output an (n−1)th stage of first driving signal through an (n−1)th stage of first driving signal output terminal; an nth first conversion sub-circuit is respectively electrically connected to the (n−1)th stage of first driving signal output terminal, the nth stage of first driving signal output terminal, and a first voltage terminal, a second voltage terminal and an nth stage of second driving signal output terminal, and is configured to control the nth stage of second driving signal output terminal to output an nth stage of second driving signal under the control of the (n−1)th stage of first driving signal and the nth stage of first driving signal according to a first voltage signal provided by the first voltage terminal and a second voltage signal provided by the second voltage terminal.

Optionally, the driving module further includes a second conversion circuit; wherein the second conversion circuit includes a plurality of second conversion sub-circuits; an (n−1)th second conversion sub-circuit is respectively electrically connected to the (n−1)th stage of first driving signal output terminal and the nth stage of first driving signal output terminal, the nth stage of second driving signal output terminal, a third voltage terminal, a fourth voltage terminal and an (n−1)th stage of third driving signal output terminal, is configured to control the (n−1)th stage of third driving signal output terminal to output an (n−1)th stage of third driving signal under the control of the (n−1)th stage of first driving signal, the nth stage of first driving signal and the nth stage of second driving signal, according to a third voltage signal provided by the third voltage terminal and a fourth voltage signal provided by the fourth voltage terminal.

Optionally, the nth first conversion sub-circuit comprises an nth first conversion module and an nth second conversion module; the nth first conversion module is respectively electrically connected to the (n−1)th stage of first driving signal output terminal, the nth stage of first driving signal output terminal, the first voltage terminal and the nth stage of second driving signal output terminal, and is configured to control to output the first voltage signal provided by the first voltage terminal to the nth stage of second driving signal output terminal under the control of the (n−1)th stage of first driving signal, and output the first voltage signal to the nth stage of second driving signal output terminal under the control of the nth stage of first driving signal; the nth second conversion module is respectively electrically connected to the (n−1)th stage of first driving signal output terminal, the nth stage of first driving signal output terminal, the second voltage terminal and the nth stage of second driving signal output terminal, and is configured to output the second voltage signal provided by the second voltage terminal to the nth stage of second driving signal output terminal under the control of the (n−1)th stage of first driving signal and the nth stage of first driving signal.

Optionally, the (n−1)th second conversion sub-circuit may include an (n−1)th third conversion module, an (n−1)th fourth conversion module and an (n−1)th fifth conversion module; the (n−1)th third conversion module is respectively electrically connected to the (n−1)th stage of first driving signal output terminal, the third voltage terminal and the (n−1)th stage of third driving signal output terminal, is configured to output the third voltage signal provided by the third voltage terminal to the (n−1)th stage of third driving signal output terminal under the control of the (n−1)th stage of first driving signal; the (n−1)th fourth conversion module is respectively electrically connected to the nth stage of first driving signal output terminal, the fourth voltage terminal and the (n−1)th stage of third driving signal output terminal, is configured to output a fourth voltage signal provided by the fourth voltage terminal to the (n−1)th stage of third driving signal output terminal under the control of the nth stage of first driving signal; the (n−1)th fifth conversion module is respectively electrically connected to the nth stage of second driving signal output terminal, the fourth voltage terminal and of the (n−1)th stage of third driving signal output terminal, is configured to output a fourth voltage signal provided by the fourth voltage terminal to the (n−1)th stage of third driving signal output terminal under the control of the nth stage of second driving signal.

Optionally, the nth first conversion module includes a first transistor and a second transistor, and the nth second conversion module includes a third transistor and a fourth transistor; a control electrode of the first transistor is electrically connected to the (n−1)th stage of first driving signal output terminal, a first electrode of the first transistor is electrically connected to the first voltage terminal, and a second electrode of the first transistor is electrically connected to the nth stage of second driving signal output terminal; a control electrode of the second transistor is electrically connected to the nth stage of first driving signal output terminal, a first electrode of the second transistor is electrically connected to the first voltage terminal, and a second electrode of the second transistor is electrically connected to the nth stage of second driving signal output terminal; a control electrode of the third transistor is electrically connected to the (n−1)th stage of first driving signal output terminal, a first electrode of the third transistor is electrically connected to the second voltage terminal, and a second electrode of the third transistor is electrically connected to the nth stage of second driving signal output terminal; a control electrode of the fourth transistor is electrically connected to the nth stage of first driving signal output terminal, a first electrode of the fourth transistor is electrically connected to the second electrode of the third transistor, and a second electrode of the fourth transistor is electrically connected to the nth stage of second driving signal output terminal.

Optionally, both the first transistor and the second transistor are transistors of a first type, and the third transistor and the fourth transistor are both transistors of a second type.

Optionally, the (n−1)th third conversion module includes a fifth transistor, the (n−1)th fourth conversion module includes a sixth transistor, and the (n−1)th fifth conversion module includes a seventh transistor; a control electrode of the fifth transistor is electrically connected to the (n−1)th stage of first driving signal output terminal, a first electrode of the fifth transistor is electrically connected to the third voltage terminal, and a second electrode of the fifth transistor is electrically connected to the (n−1)th stage of third driving signal output terminal; a control electrode of the sixth transistor is electrically connected to the nth stage of first driving signal output terminal, a first electrode of the sixth transistor is electrically connected to the fourth voltage terminal, and a second electrode of the sixth transistor is electrically connected to the (n−1)th stage of third driving signal output terminal; a control electrode of the seventh transistor is electrically connected to the nth stage of second driving signal output terminal, a first electrode of the seventh transistor is electrically connected to the fourth voltage terminal, and a second electrode of the seventh transistor is electrically connected to the (n−1)th stage of third driving signal output terminal.

Optionally, the fifth transistor and the seventh transistor are transistors of a first type, and the sixth transistor is a transistor of a second type.

Optionally, the nth stage of first driving sub-circuit includes a first node control circuit, a control node control circuit, a second node control circuit, a first energy storage circuit, a second energy storage circuit and an output circuit, wherein, the first node control circuit is electrically connected to a control clock signal terminal, a sixth voltage terminal, a first node and a control node respectively, and is configured to control to write a sixth voltage signal provided by the sixth voltage terminal into the first node under the control of a control clock signal provided by the control clock signal terminal, and write the control clock signal provided by the control clock signal terminal into the first node under the control of a potential of the control node; the control node control circuit is electrically connected to the control clock signal terminal, an input terminal, the control node, the first node, an output clock signal terminal and a fifth voltage terminal respectively, is configured to write an input signal provided by the input terminal into the control node under the control of the control clock signal, and write a fifth voltage signal provided by the fifth voltage terminal into the first node under the control of a potential of the first node and an output control signal provided by the output control clock signal terminal; the second node control circuit is electrically connected to the sixth voltage terminal, the control node, and a second node, respectively, is configured to control to connect the control node and the second node under the control of a sixth voltage signal provided by the sixth voltage terminal; a first terminal of the first energy storage circuit is electrically connected to the second node, and a second terminal of the first energy storage circuit is connected to the nth stage of first driving signal output terminal; the first energy storage circuit is used to store electrical energy; a first terminal of the second energy storage circuit is electrically connected to the first node, a second terminal of the second energy storage circuit is electrically connected to the fifth voltage terminal, and the second energy storage circuit is used to store electric energy; the output circuit is respectively connected to the first node, the second node, the output clock signal terminal, the fifth voltage terminal and the nth stage of first driving signal output terminal, is configured to output the fifth voltage signal provided by the fifth voltage terminal to the nth stage of first driving signal output terminal under the control of the potential of the first node, and output the output clock signal to the nth stage of first driving signal output terminal under the control of the potential of the second node.

Optionally, the first node control circuit comprises a first control transistor and a second control transistor; a control electrode of the first control transistor is electrically connected to the control clock signal terminal, a first electrode of the first control transistor is electrically connected to the sixth voltage terminal, and a second electrode of the first control transistor is electrically connected to the first node; a control electrode of the second control transistor is electrically connected to the control node, a first electrode of the second control transistor is electrically connected to the control clock signal terminal, and a second electrode of the second control transistor is electrically connected to the first node; the control node control circuit includes a third control transistor, a fourth control transistor and a fifth control transistor; a control electrode of the third control transistor is electrically connected to the control clock signal terminal, a first electrode of the third control transistor is electrically connected to the input terminal, and a second electrode of the third control transistor is electrically connected to the control node; a control electrode of the fourth control transistor is electrically connected to the first node, and a first electrode of the fourth control transistor is electrically connected to the fifth voltage terminal; a control electrode of the fifth control transistor is electrically connected to the output clock signal terminal, a first electrode of the fifth control transistor is electrically connected to the second electrode of the fourth control transistor, and a second electrode of the fifth control transistor is electrically connected to the control node; the second node control circuit includes a sixth control transistor; a control electrode of the sixth control transistor is electrically connected to the sixth voltage terminal, a first electrode of the sixth control transistor is electrically connected to the control node, and a second electrode of the sixth control transistor is electrically connected to the second node; the first energy storage circuit includes a first capacitor, and the second energy storage circuit includes a second capacitor; a first terminal of the first capacitor is electrically connected to the second node, and a second terminal of the first capacitor is electrically connected to the nth stage of first driving signal output terminal; a first terminal of the second capacitor is electrically connected to the first node, and a second terminal of the second capacitor is electrically connected to the fifth voltage terminal; the output circuit includes a first output transistor and a second output transistor; a control electrode of the first output transistor is electrically connected to the first node, a first electrode of the first output transistor is electrically connected to the fifth voltage terminal, and a second electrode of the first output transistor is electrically connected to the nth stage of first driving signal output terminal; a control electrode of the second output transistor is electrically connected to the second node, a first electrode of the second output transistor is electrically connected to the nth stage of first driving signal output terminal, and a second electrode of the second output transistor is electrically connected to the output clock signal terminal.

In a second aspect, an embodiment of the present disclosure provides a display panel, comprising the driving module according to any one of claims 1 to 10 arranged in a peripheral area and N rows and M columns of pixel circuits arranged in a display area; N and M are positive integers; the driving module is used to provide driving signals for the pixel circuits.

Optionally, the driving signal comprises a first driving signal and a second driving signal; the first driving circuit included in the driving module is arranged on a side of the first conversion circuit included in the driving module away from the display area.

Optionally, the driving signal further comprises a third driving signal; the driving module further comprises a second conversion circuit; the second conversion circuit is arranged on a side of the first conversion circuit close to the display area.

Optionally, an nth row and mth column of pixel circuit includes an nth row and mth column of data writing-in circuit, an nth row and mth column of compensation control circuit, an nth row and mth column of first reset circuit, an nth row and mth column of second reset circuit, an nth row and mth column of a first light emitting control circuit, an nth row and mth column of second light emitting control circuit, an nth row and mth column of driving circuit, an nth row and mth column of third energy storage circuit and an nth row and the mth column of light-emitting element; n is a positive integer less than or equal to N, and m is a positive integer less than or equal to M; the nth row and mth column of data writing-in circuit is respectively electrically connected to the nth stage of first driving signal output terminal, an mth column of data line and a first terminal of the nth row and mth column of driving circuit, is configured to write a data voltage provided by the mth column of data line into the first terminal of the nth row and mth column of pixel circuit under the control of the nth stage of first driving signal provided by the nth driving signal output terminal; the nth row and mth column of compensation control circuit is respectively connected to the nth stage of first driving signal output terminal, a control terminal of the nth row and mth column of driving circuit, and a second terminal of the nth row and mth column of driving circuit, and is configured to control to connect the control terminal of the nth row and mth column of driving circuit and the second terminal of the nth row and mth column of driving circuit under the control of the nth stage of first driving signal; the nth row and the mth column of first reset circuit in is electrically connected to the (n−1)th stage of first driving signal output terminal, the control terminal of the nth row and the mth column of driving circuit and a first initial voltage terminal, is configured to write a first initial voltage provided by the first initial voltage terminal into the control terminal of the nth row and the mth column of the driving circuit under the control of the (n−1)th stage of first driving signal provided by the (n−1)th stage of first driving signal output terminal; the nth row and mth column of second reset circuit is electrically connected to the nth stage of first driving signal output terminal, a first electrode of the nth row and mth column of the light emitting element and a second initial voltage terminal, respectively, is configured to write a second initial voltage provided by the second initial voltage terminal into the first electrode of the nth row and mth column of the light-emitting element under the control of the nth stage of first driving signal; the control terminal of the nth row and the mth column of the first light-emitting control circuit is electrically connected to the nth stage of second driving signal output terminal or the (n+1)th second driving signal output terminal; the nth row and the mth column of the first light emitting control circuit is also electrically connected to the first level terminal and the first terminal of the nth row and mth column of driving circuit respectively, and is configured to connect the first level terminal and the first terminal of the nth row and mth column of driving circuit under the control of the nth stage of second driving signal provided by the nth stage of second driving signal output terminal or the (n+1)th second driving signal provided by the (n+1)th second driving signal output terminal; the nth row and mth column of second light emitting control circuit is respectively connected to the nth stage of second driving signal output terminal, the second terminal of the nth row and mth column of driving circuit and the first electrode of the nth row and mth column of the light emitting element, and is used to control to connect the second terminal of the nth row and mth column of driving circuit and the first electrode of the nth row and mth column of the light emitting element under the control of the nth stage of second driving signal; the nth row and the mth column of driving circuit is used to generate a driving current under the control of a potential of the control terminal of the nth row and the mth column of driving circuit; the nth row and mth column of third energy storage circuit is electrically connected to the control terminal of the nth row and mth column of driving circuit and the first level terminal, is configured to store electric energy; the second electrode of the nth row and mth column of the light emitting element is electrically connected to the second level terminal.

Optionally, the nth row and mth column of pixel circuit includes an nth row and mth column of data writing-in circuit, an nth row and mth column of on-off control circuit, an nth row and mth column of compensation control circuit, an nth row and mth column of first reset circuit, an nth row and the mth column of the second reset circuit, an nth row and mth column of the first light emitting control circuit, an nth row and mth column of the second light emitting control circuit, an nth row and the mth column of driving circuit, an nth row and the mth column of third energy storage circuit and an nth row and the mth column of light emitting element; n is a positive integer less than or equal to N, and m is a positive integer less than or equal to M; the nth row and mth column of data writing-in circuit is respectively electrically connected to the nth stage of first driving signal output terminal, an mth column of data line and a first terminal of the nth row and mth column of driving circuit, is configured to write a data voltage provided by the mth column of data line into the first terminal of the nth row and mth column of pixel circuit under the control of the nth stage of first driving signal provided by the nth driving signal output terminal; the nth row and the mth column of on-off control circuit is respectively electrically connected to the nth stage of third driving signal output terminal, the control terminal of the nth row and the mth column of driving circuit and an nth row and the mth column of connection node, is configured to control to connect the control terminal of the nth row and mth column of driving circuit and the nth row and mth column of connection node under the control of the nth stage of third driving signal provided by the nth stage of third driving signal output terminal; the nth row and mth column of compensation control circuit is respectively connected to the nth stage of first driving signal output terminal, the nth row and mth column of connection node and the second terminal of the nth row and mth column of driving circuit, is configured to control to connect the nth row and mth column of connection node and the second terminal of the nth row and mth column of driving circuit under the control of the nth stage of first driving signal; the nth row and the mth column of first reset circuit is electrically connected to the (n−1)th stage of first driving signal output terminal, the nth row and the mth column of connection node and the first initial voltage terminal, and is configured to write a first initial voltage provided by the first initial voltage terminal into the nth row and mth column of connection node under the control of the (n−1)th stage of first driving signal provided by the (n−1)th stage of first driving signal output terminal; the nth row and mth column of second reset circuit is electrically connected to the nth stage of first driving signal output terminal, the first electrode of the nth row and mth column of the light emitting element and a second initial voltage terminal, respectively, is configured to write a second initial voltage provided by the second initial voltage terminal into the first electrode of the nth row and mth column of light-emitting element under the control of the nth stage of first driving signal; the control terminal of the nth row and the mth column of the first light-emitting control circuit is electrically connected to the nth stage of second driving signal output terminal or the (n+1)th second driving signal output terminal; the nth row and the mth column of first light emitting control circuit is also electrically connected to the first level terminal and the first terminal of the nth row and mth column of driving circuit respectively, and is configured to control to connect the first level terminal and the first terminal of the nth row and mth column of driving circuit under the control of the nth stage of second driving signal provided by the nth stage of second driving signal output terminal or the (n+1)th second driving signal provided by the (n+1)th second driving signal output terminal; the nth row and mth column of second light emitting control circuit is respectively connected to the nth stage of second driving signal output terminal, the second terminal of the nth row and mth column of driving circuit and the first electrode of the nth row and mth column of the light emitting element, and is used to control to connect the second terminal of the nth row and mth column of driving circuit and the first electrode of the nth row and mth column of light emitting element under the control of the nth stage of second driving signal; the nth row and the mth column of driving circuit is used to generate a driving current under the control of a potential of the control terminal of the nth row and the mth column of driving circuit; the nth row and mth column of third energy storage circuit is electrically connected to the control terminal of the nth row and mth column of driving circuit and the first level terminal and is configured to store electric energy; the second electrode of the nth row and the mth column of the light-emitting element is electrically connected to the second level terminal; the nth stage of third driving signal output terminal and the nth stage of second driving signal output terminal are connected to a same driving signal.

Optionally, the nth row and mth column of pixel circuit includes an nth row and mth column of data writing-in circuit, an nth row and mth column of compensation control circuit, an nth row and the mth column of first reset circuit, an nth row and mth column of second reset circuit, an nth row and mth column of the first light emitting control circuit, an nth row and mth column of the second light emitting control circuit, an nth row and mth column of driving circuit, an nth row and the mth column of third energy storage circuit and an nth row and the mth column of light emitting element; n is a positive integer less than or equal to N, and m is a positive integer less than or equal to M; the nth row and mth column of data writing-in circuit is respectively electrically connected to the nth stage of first driving signal output terminal, an mth column of data line and the first terminal of the nth row and mth column of driving circuit, is configured to write a data voltage provided by the mth column of data line into the first terminal of the nth row and mth column of pixel circuit under the control of the nth stage of first driving signal provided by the nth driving signal output terminal; the nth row and mth column of compensation control circuit is respectively connected to the nth stage of third driving signal output terminal, the control terminal of the nth row and mth column of driving circuit, and the second terminal of the nth row and mth column of driving circuit, and is used to control to connect the control terminal of the control terminal of the nth row and the mth column of driving circuit and the second terminal of the nth row and the mth column of the driving circuit under the control of the nth stage of third driving signal provided by the nth stage of third driving signal output terminal; the nth row and mth column of first reset circuit is electrically connected to the (n−1)th stage of third driving signal output terminal, the control terminal of the nth row and mth column of driving circuit and the first initial voltage terminal, is configured to write the first initial voltage provided by the first initial voltage terminal into the control terminal of the nth row and mth column of driving circuit under the control of the (n−1)th stage of third driving signal provided by the (n−1)th stage of third driving signal output terminal; the nth row and mth column of second reset circuit is electrically connected to the nth stage of first driving signal output terminal, the first electrode of the nth row and mth column of the light emitting element and a second initial voltage terminal, respectively, is configured to write a second initial voltage provided by the second initial voltage terminal into the first electrode of the nth row and mth column of the light-emitting element under the control of the nth stage of first driving signal; the control terminal of the nth row and the mth column of the first light-emitting control circuit is electrically connected to the nth stage of second driving signal output terminal or the (n+1)th second driving signal output terminal; the nth row and mth column of first light emitting control circuit is also electrically connected to the first level terminal and the first terminal of the nth row and mth column of driving circuit respectively, and is used to control to connect the first level terminal and the first terminal of the nth row and mth column of driving circuit under the control of the nth stage of second driving signal provided by the nth stage of second driving signal output terminal or the (n+1)th second driving signal provided by the (n+1)th second driving signal output terminal; the nth row and mth column of second light emitting control circuit is respectively connected to the nth stage of second driving signal output terminal, the second terminal of the nth row and mth column of driving circuit and the first electrode of the nth row and mth column of the light emitting element, and is used to control to connect the second terminal of the nth row and mth column of driving circuit and the first electrode of the nth row and mth column of light emitting element under the control of the nth stage of second driving signal; the nth row and the mth column of driving circuit is used to generate a driving current under the control of a potential of the control terminal of the nth row and the mth column of driving circuit; the nth row and mth column of third energy storage circuit is respectively electrically connected to the control terminal of the nth row of mth column of driving circuit and the first level terminal, is used to store electric energy; the second electrode of the nth row and mth column of the light-emitting element is electrically connected to the second level terminal.

Optionally, the nth row and mth column of pixel circuit includes an nth row and mth column of data writing-in circuit, an nth row and mth column of compensation control circuit, an nth row and mth column of first reset circuit, an nth row and mth column of second reset circuit, an nth row and mth column of first light emitting control circuit, an nth row and mth column of second light emitting control circuit, an nth row and mth column of driving circuit, an nth row and the mth column of third energy storage circuit and an nth row and the mth column of light-emitting element; n is a positive integer less than or equal to N, and m is a positive integer less than or equal to M; the nth row and mth column of data writing-in circuit is respectively electrically connected to the nth stage of first driving signal output terminal, an mth column of data line and the first terminal of the nth row and mth column of driving circuit, is configured to write a data voltage provided by the mth column of data line into the first terminal of the nth row and mth column of pixel circuit under the control of the nth stage of first driving signal provided by the nth driving signal output terminal; the nth row and mth column of compensation control circuit is respectively connected to the nth stage of third driving signal output terminal, the control terminal of the nth row and mth column of driving circuit, and the second terminal of the nth row and mth column of driving circuit, and is used to control to connect the control terminal of the nth row and the mth column of driving circuit and the second terminal of the nth row and the mth column of the driving circuit under the control of the nth stage of third driving signal provided by the nth stage of third driving signal output terminal; the nth row and mth column of first reset circuit is electrically connected to the (n−1)th stage of third driving signal output terminal, the control terminal of the nth row and mth column of driving circuit and the first initial voltage terminal, is configured to write a first initial voltage provided by the first initial voltage terminal into the control terminal of the nth row and mth column of the driving circuit under the control of the (n−1)th stage of third driving signal provided by the (n−1)th stage of third driving signal output terminal; the nth row and mth column of second reset circuit is electrically connected to the nth stage of second driving signal output terminal, the first electrode of the nth row and mth column of light-emitting element and a second initial voltage terminal respectively, is configured to write a second initial voltage provided by the second initial voltage terminal into the first electrode of the nth row and mth column of light emitting element under the control of the nth stage of second driving signal provided by the nth stage of second driving signal output terminal; the control terminal of the nth row and the mth column of the first light-emitting control circuit is electrically connected to the nth stage of second driving signal output terminal or the (n+1)th second driving signal output terminal; the nth row and mth column of first light emitting control circuit is also electrically connected to the first level terminal and the first terminal of nth row and mth column of the driving circuit respectively, and is configured to control to connect the first level terminal and the first terminal of the nth row and mth column of driving circuit under the control of the nth stage of second driving signal or the (n+1)th second driving signal provided by the (n+1)th second driving signal output terminal; the nth row and mth column of second light emitting control circuit is respectively connected to the nth stage of second driving signal output terminal, the second terminal of the nth row and mth column of driving circuit and the first electrode of the nth row and mth column of the light emitting element, and is used to control to connect the second terminal of the nth row and mth column of driving circuit and the first electrode of the nth row and mth column of light emitting element under the control of the nth stage of second driving signal; the nth row and the mth column of driving circuit is used to generate a driving current under the control of a potential of the control terminal of the nth row and the mth column of driving circuit; the nth row and mth column of third energy storage is electrically connected to the control terminal of the nth row and mth column of driving circuit and the first level terminal, is used store electric energy; the second electrode of the nth row and mth column of the light-emitting element is electrically connected to the second level terminal.

In a third aspect, an embodiment of the present disclosure provides a display device comprising the display panel.

DETAILED DESCRIPTION

The following will clearly and completely describe the technical solutions in the embodiments of the present disclosure with reference to the accompanying drawings. Apparently, the described embodiments are only some of the embodiments of the present disclosure, not all of them. Based on the embodiments in the present disclosure, all other embodiments obtained by persons of ordinary skill in the art without creative efforts belong to the protection scope of the present disclosure.

The transistors used in all the embodiments of the present disclosure may be triodes, thin film transistors or field effect transistors or other devices with the same characteristics. In the embodiments of the present disclosure, in order to distinguish the two electrodes of the transistor except the gate electrode, one electrode is called the first electrode, and the other electrode is called the second electrode.

In actual operation, when the transistor is a thin film transistor or a field effect transistor, the first electrode may be a drain electrode, and the second electrode may be a source electrode; or, the first electrode may be a source electrode, the second electrode may be a drain electrode.

Figure 1:
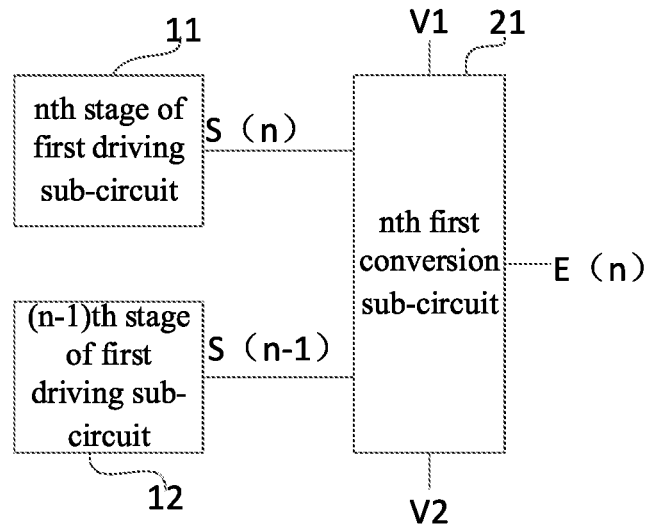
FIG. 1 is a schematic diagram of the connection relationship among the nth stage of first driving sub-circuit, the (n−1)th stage of first driving sub-circuit, and the nth first conversion sub-circuit in the driving module according to an embodiment of the present disclosure.

The driving module described in the embodiment of the present disclosure includes a first driving circuit and a first conversion circuit; n is a positive integer; the first driving circuit includes a plurality of stages first driving sub-circuit; the first conversion circuit includes a plurality of first conversion sub-circuits;

As shown in FIG. 1, the nth stage of first driving sub-circuit 11 is used to generate and output the nth stage of first driving signal through the nth stage of first driving signal output terminal S(n);

The (n−1)th stage of first driving sub-circuit 12 is used to generate and output the (n−1)th stage of first driving signal through the (n−1)th stage of first driving signal output terminal S(n−1);

The nth first conversion sub-circuit 21 is respectively connected to the (n−1)th stage of first driving signal output terminal S(n−1), the nth stage of first driving signal output terminal S(n), and the first voltage terminal V1, the second voltage terminal V2 and the nth stage of second driving signal output terminal E(n), and is configured to control the nth stage of second driving signal output terminal E(n) to output the nth stage of second driving signal under the control of the (n−1)th stage of first driving signal and the nth stage of first driving signal according to the first voltage signal provided by the first voltage terminal V1 and the second voltage signal provided by the second voltage terminal V2.

The driving module described in the embodiment of the present disclosure is added with a first conversion circuit to generate a second driving signal according to the first voltage signal and the second voltage signal under the control of the first driving signal generated by the first driving circuit, so as to reduce the space occupied by the driving module, reduce the width of the driving module, which is beneficial to realize the narrow frame of the display panel.

In at least one embodiment of the present disclosure, the first voltage signal and the second voltage signal may be DC voltage signals, but not limited thereto.

In the embodiment of the present disclosure, a corresponding first driving sub-circuit and a first conversion sub-circuit are provided to each row of pixel circuits, so as to generate the first driving signal and the second driving signal provided to the row of pixel circuits.

In at least one embodiment of the present disclosure, when the display panel is a small-sized display panel, such as a watch, the first driving circuit and the first conversion circuit may be arranged on a single side of the display panel for single-side driving; when the display panel is of a medium or large size, such as a mobile phone or a computer screen, in order to adapt to the display quality, the first driving circuit and the first conversion circuit can be arranged on both sides of the display panel for bilateral synchronous driving.

Figure 2:
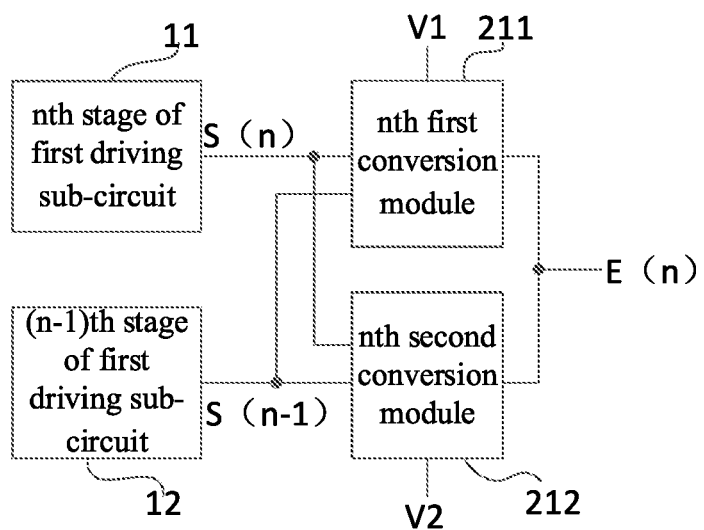
FIG. 2 is a schematic diagram of the nth stage of first conversion module and the nth stage of second conversion module included in the nth first conversion sub-circuit on the basis of FIG. 1.

In at least one embodiment of the present disclosure, as shown in FIG. 2, the nth first conversion sub-circuit may include an nth first conversion module 211 and an nth second conversion module 212;

The nth first conversion module 211 is respectively connected to the (n−1)th stage of first driving signal output terminal S(n−1), the nth stage of first driving signal output terminal S(n), the first voltage terminal V1 and the nth stage of second driving signal output terminal E(n), and is used to control to output the first voltage signal provided by the first voltage terminal V1 to the nth-stage of second driving signal output terminal under the control of the (n−1)th stage of first driving signal, and output the first voltage signal to the nth stage of second driving signal output E(n) under the control of the nth stage of first driving signal;

The nth second conversion module 212 is respectively connected to the (n−1)th stage of first driving signal output terminal S(n−1), the nth stage of first driving signal output terminal S(n), the second voltage terminal V2 and the nth stage of second driving signal output terminal S(n), and is used to output the second voltage signal provided by the second voltage terminal V2 to the nth stage of second driving signal output terminal S(n) under the control of the (n−1)th stage of first driving signal and the nth stage of first driving signal.

At least one embodiment of the nth first conversion sub-circuit shown in FIG. 2 includes the nth first conversion module 211 and the nth second conversion module 212; the nth first conversion module controls to output the first voltage signal to the nth stage of second driving signal output terminal under the control of the (n−1)th stage of first driving signal, and output the first voltage signal to the nth stage of second driving signal output terminal E(n) under the control of the nth stage of first driving signal, and the nth second conversion module 212 outputs the second voltage signal to the nth stage of second driving signal output terminal S(n) under the control of the (n−1)th stage of first driving signal and the nth stage of first driving signal.

Optionally, the nth first conversion module includes a first transistor and a second transistor, and the nth second conversion module includes a third transistor and a fourth transistor;

A control electrode of the first transistor is electrically connected to the (n−1)th stage of first driving signal output terminal, a first electrode of the first transistor is electrically connected to the first voltage terminal, and a second electrode of the first transistor is electrically connected to the nth stage of second driving signal output terminal;

A control electrode of the second transistor is electrically connected to the nth stage of first driving signal output terminal, the first electrode of the second transistor is electrically connected to the first voltage terminal, and a second electrode of the second transistor is electrically connected to the nth stage of second driving signal output terminal;

A control electrode of the third transistor is electrically connected to the (n−1)th stage of first driving signal output terminal, a first electrode of the third transistor is electrically connected to the second voltage terminal, and a second electrode of the third transistor is electrically connected to the nth stage of second driving signal output terminal;

A control electrode of the fourth transistor is electrically connected to the nth stage of first driving signal output terminal, a first electrode of the fourth transistor is electrically connected to the second electrode of the third transistor, and a second electrode of the fourth transistor is electrically connected to the nth stage of second driving signal output terminal.

Optionally, both the first transistor and the second transistor are transistors of the first type, and both the third transistor and the fourth transistor are transistors of the second type.

In at least one embodiment of the present disclosure, the first type of transistor may be a p-type transistor, and the second type of transistor may be an n-type transistor; or, the first type of transistor may be an n-type transistor, so the second type of transistor may be a p-type transistor.

Figure 3:
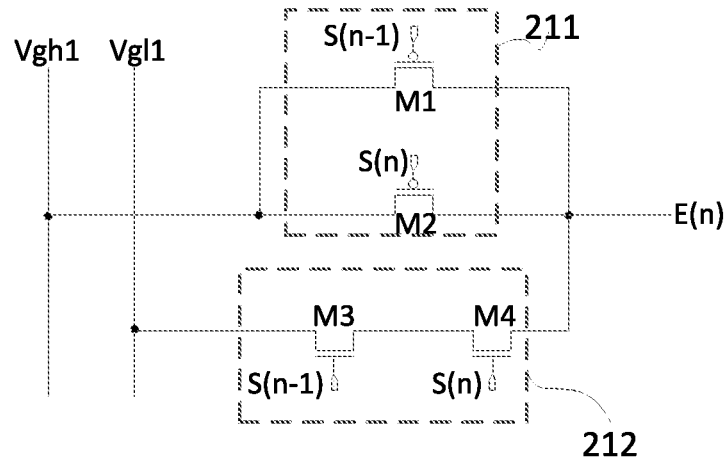
FIG. 3 is a circuit diagram of the nth first conversion sub-circuit.

As shown in FIG. 3, the nth first conversion module 211 may include a first transistor M1 and a second transistor M2, and the nth second conversion module 212 includes a third transistor M3 and a fourth transistor M4;

The gate electrode of the first transistor M1 is electrically connected to the (n−1)th stage of first driving signal output terminal S(n−1), and the source electrode of the first transistor M1 is electrically connected to the first high voltage terminal Vgh1, the drain electrode of the first transistor M1 is electrically connected to the nth stage of second driving signal output terminal E(n);

The gate electrode of the second transistor M2 is electrically connected to the nth stage of first driving signal output terminal S(n), and the source electrode of the second transistor M2 is electrically connected to the first high voltage terminal Vgh1, the drain electrode of the second transistor M2 is electrically connected to the nth stage of second driving signal output terminal E(n);

The gate electrode of the third transistor M3 is electrically connected to the (n−1)th stage of first driving signal output terminal S(n−1), and the source electrode of the third transistor M3 is electrically connected to the first low voltage terminal Vgl1, the drain electrode of the third transistor M3 is electrically connected to the nth stage of second driving signal output terminal E(n);

The gate electrode of the fourth transistor M4 is electrically connected to the nth stage of first driving signal output terminal S(n), the source electrode of the fourth transistor M4 is electrically connected to the drain electrode of the third transistor M3, the drain electrode of the fourth transistor M4 is electrically connected to the nth stage of second driving signal output terminal E(n).

In at least one embodiment of the nth first conversion sub-circuit shown in FIGS. 3, M1 and M2 may be P-type metal-oxide-semiconductor (PMOS) transistors, and M3 and M4 may be N-type metal-oxide-semiconductor (NMOS) transistors, but not limited thereto.

At least one embodiment of the nth first conversion sub-circuit shown in FIG. 3 can provide a corresponding second driving signal for the nth row of pixel circuits arranged in the display area of the display panel, and the second driving signal can be the light emitting control signal, the nth stage of first driving signal may be a driving signal provided to the control electrode of the n-type transistor in the nth row of pixel circuits, but it is not limited thereto.

In at least one embodiment of the nth first conversion sub-circuit shown in FIG. 3, the voltage value of the first high voltage signal provided by the first high voltage terminal Vgh1 may be 7V, and the voltage value of the first high low signal provided by the first low voltage terminal Vgl1 can be −9V, but not limited thereto.

Figure 4:
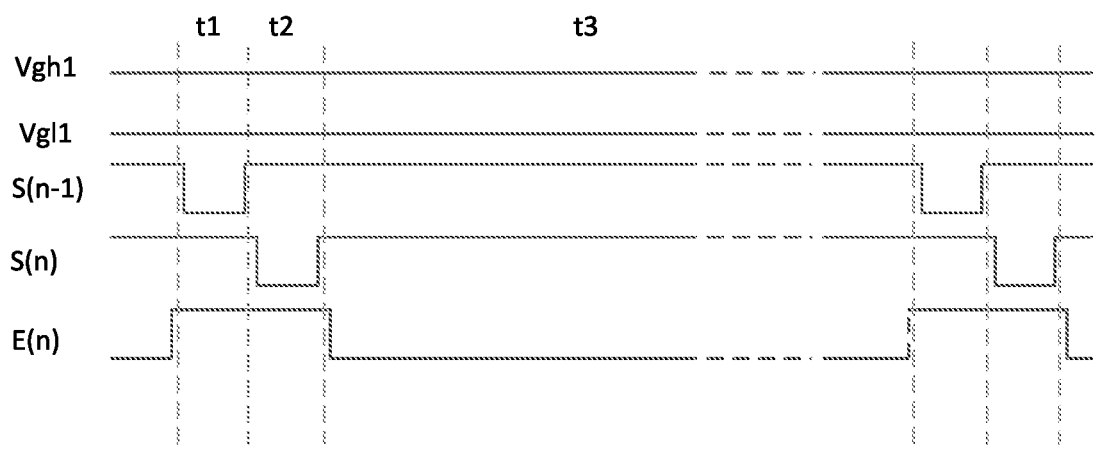
FIG. 4 is a work timing diagram of the nth first conversion sub-circuit shown in FIG. 3.

As shown in FIG. 4, when at least one embodiment of the nth first conversion sub-circuit shown in FIG. 3 is in operation, the conversion period includes a first conversion phase t1, a second conversion phase t2 and a third conversion phase t3;

In the first conversion phase t1, S(n−1) provides a low voltage signal, S(n) provides a high voltage signal, M1 is turned on, M2 is turned off, M3 is turned off, and M4 is turned on, so that the first high voltage signal provided by the first high voltage terminal Vgh1 is output to E(n);

In the second conversion phase t2, S(n−1) provides a high voltage signal, S(n) provides a low voltage signal, M1 is turned off, M2 is turned on, M3 is turned on, and M4 is turned off, so that the first high voltage signal provided by the first high voltage terminal Vgh1 is output to E(n);

In the third conversion phase t3, S(n−1) provides a high voltage signal, S(n) provides a high voltage signal, both M1 and M2 are turned off, and M3 and M4 are both turned on, so as to convert the first low voltage signal provided by the first low voltage terminal Vgl1 is output to E(n).

Figure 5:
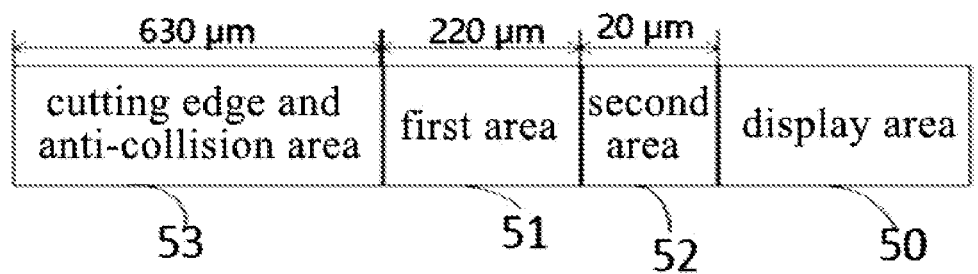
FIG. 5 is a schematic diagram of the positional relationship among the cutting edge and the anti-collision area 53, the first area 51, the second area 52, and the display area 50 according to at least one embodiment of the present disclosure.

As shown in FIG. 5, the one marked 50 is the display area, the one marked 51 is the first area where the first driving circuit is arranged, the one marked 52 is the second area where the first conversion circuit is arranged, and the one marked 53 is the cutting edge and anti-collision area 53;

The first area 51, the second area 52, the cutting edge and the anti-collision area 53 are included in the side frame area of the display panel;

The width of the second area 52 is 20 um, the width of the first area 51 is 220 um, the width of the cutting edge and the anti-collision area 53 is 630 um, compared with the related art, the width of the second area 52 has been reduced a lot, which is conducive to the realization of narrow frame.

In the embodiment of the present disclosure, while reducing the frame of the display panel, a second driving signal can be connected to each row of pixel circuits. Compared with the second driving signal shared by two rows of pixel circuits in the related art, the embodiment of the present disclosure can output second driving signal row by row, and sequentially delayed by one pulse.

Figure 6:
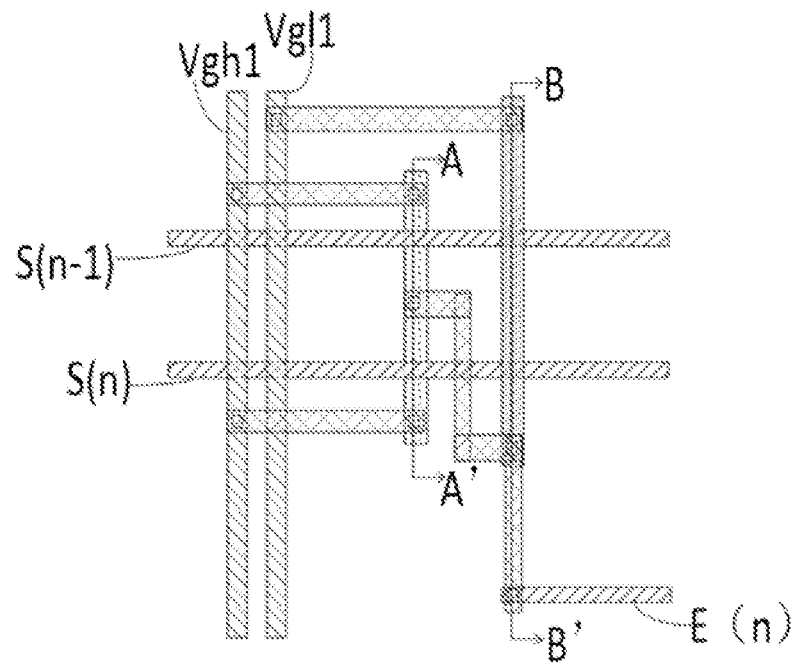
FIG. 6 is a layout diagram of the nth first conversion sub-circuit shown in FIG. 3.
Figure 7A:
FIG. 7A is a layout diagram of the first semiconductor layer in FIG. 6.
Figures 7B, 7C:
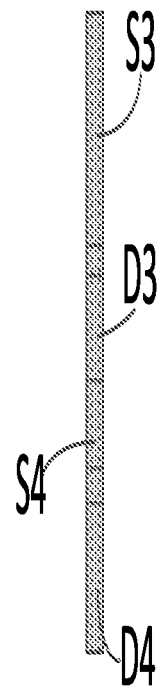
FIG. 7B is a layout diagram of the first gate metal layer in FIG. 6.
FIG. 7C is a layout diagram of the second semiconductor layer in FIG. 6.
Figure 7D:
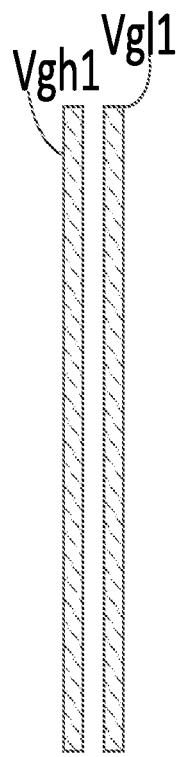
FIG. 7D is a layout diagram of the second gate metal layer in FIG. 6.
Figure 7E:
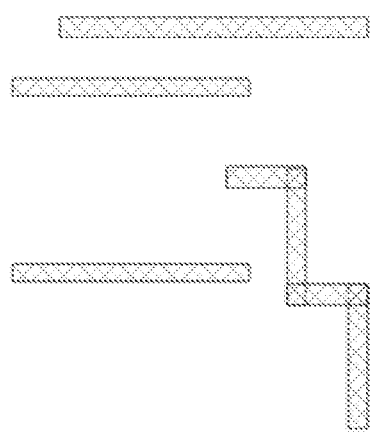
FIG. 7E is a layout diagram of the first source-drain metal layer in FIG. 6.

FIG. 6 is a layout diagram of the nth first conversion sub-circuit shown in FIG. 3, FIG. 7A is a layout diagram of the first semiconductor layer in FIG. 6, and FIG. 7B is a layout diagram of the first gate metal layer in FIG. 6, FIG. 7C is the layout diagram of the second semiconductor layer in FIG. 6, FIG. 7D is the layout diagram of the second gate metal layer in FIG. 6, and FIG. 7E is a layout diagram of the first source-drain metal layer in FIG. 6.

Figure 8:
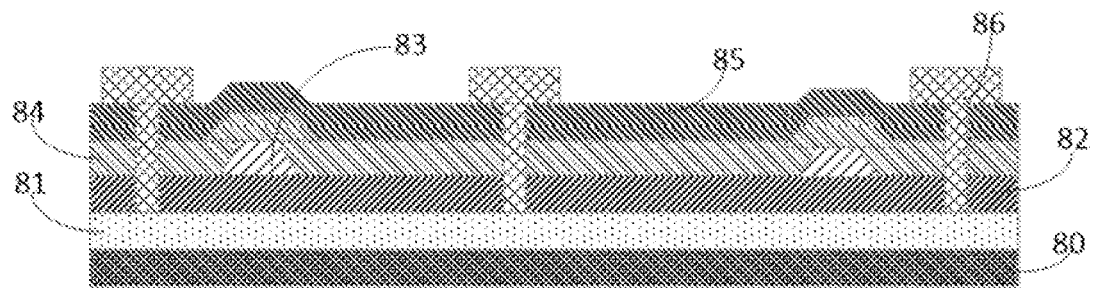
FIG. 8 is A-A' sectional view in FIG. 6.
Figure 9:
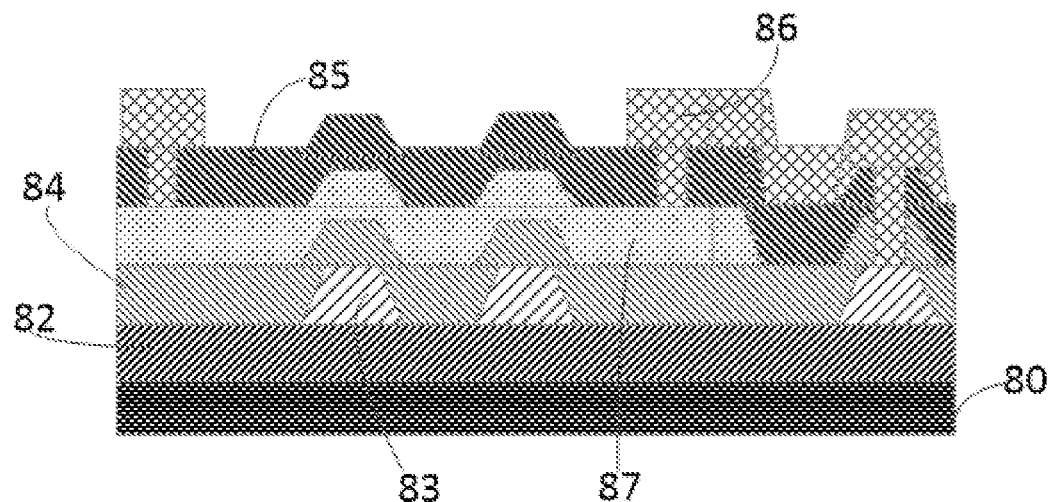
FIG. 9 is B-B' sectional view in FIG. 6.

FIG. 8 is an A-A' sectional view in FIG. 6, and FIG. 9 is a B-B' sectional view in FIG. 6.

In FIG. 7A, the one labeled S1 is the source electrode of M1, the one labeled D1 is the drain electrode of M1, the one labeled S2 is the source electrode of M2, and the one labeled D2 is the drain electrode of M2.

In FIG. 7C, the one labeled S3 is the source electrode of M1, the one labeled S3 is the source electrode of M3, the one labeled D3 is the drain electrode of M3, the one labeled S4 is the source electrode of M4, and the one labeled D4 is the drain electrode of M4.

In at least one embodiment of the present disclosure, the first semiconductor layer may be an LTPS semiconductor layer, and the second semiconductor layer may be an indium gallium zinc oxide (IGZO) semiconductor layer, but not limited thereto.

In FIG. 8, the one marked 80 is the base substrate, the one marked 81 is the first semiconductor layer, the one marked 82 is the first gate insulating layer, the one marked 83 is the first gate metal layer, and the one marked 84 is the first gate metal layer. The one marked 85 is the insulating layer, and the one marked 86 is a source-drain metal layer.

In FIG. 9, the one marked 80 is the base substrate, the one marked 82 is the first gate insulating layer, the one marked 83 is the first gate metal layer, the one marked 84 is the second gate insulating layer, and the one marked 87 is the second semiconductor layer, the one marked 85 is the insulating layer, and the one marked 86 is the source-drain metal layer.

In at least one embodiment of the present disclosure, the insulating layer 85 may include a third gate insulating layer and an interlayer dielectric layer, but not limited thereto.

Figure 10:
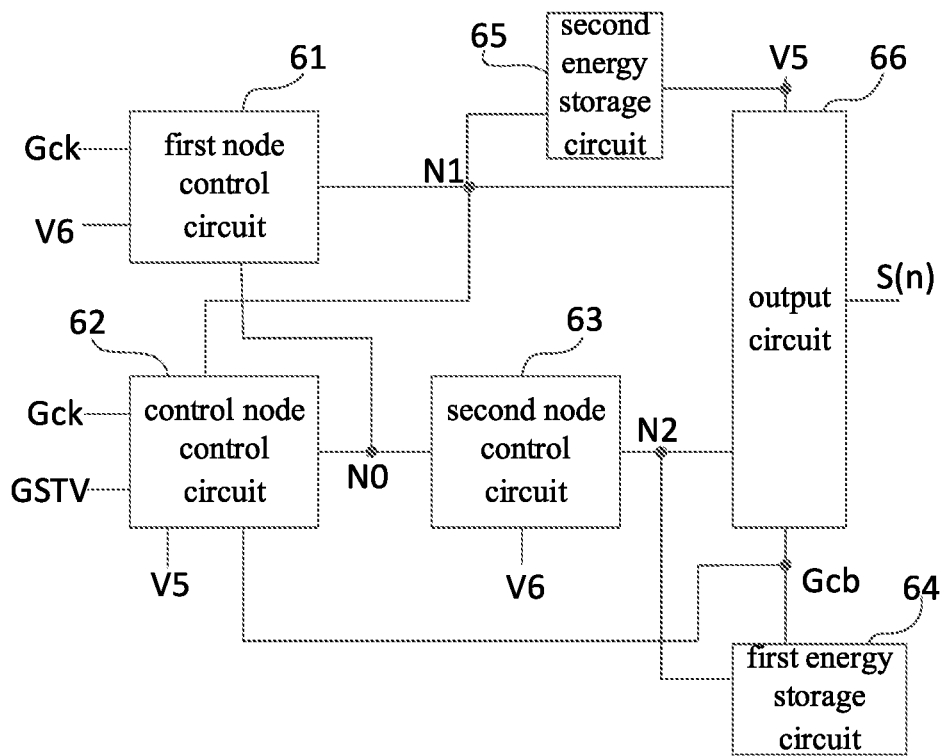
FIG. 10 is a structural diagram of the nth stage of first driving sub-circuit.

In at least one embodiment of the present disclosure, as shown in FIG. 10, the nth-stage of first driving sub-circuit may include a first node control circuit 61, a control node control circuit 62, a second node control circuit 63, a first energy storage circuit 64, a second energy storage circuit 65 and an output circuit 66, wherein, The first node control circuit 61 is electrically connected to the control clock signal terminal Gc, the sixth voltage terminal V6, the first node N1 and the control node N0 respectively, and is configured to control to write the sixth voltage signal provided by the sixth voltage terminal V6 into the first node N1 under the control of the control clock signal provided by the control clock signal terminal Gc, and write the control clock signal provided by the control clock signal terminal Gc into the first node N1 under the control of the potential of the control node N0;

The control node control circuit 62 is electrically connected to the control clock signal terminal Gc, the input terminal I1, the control node N0, the first node N1, the output clock signal terminal Go and the fifth voltage terminal V5 respectively, is configured to write the input signal provided by the input terminal I1 into the control node N0 under the control of the control clock signal, and write the fifth voltage signal provided by the fifth voltage terminal V5 into the first node under the control of the potential of the first node N1 and the output control signal provided by the output control clock signal terminal Go;

The second node control circuit 63 is electrically connected to the sixth voltage terminal V6, the control node N0, and the second node N2, respectively, is configured to control to connect the control node N0 and the second node N2 under the control of the sixth voltage signal provided by the sixth voltage terminal V6;

The first terminal of the first energy storage circuit 64 is electrically connected to the second node N2, and the second terminal of the first energy storage circuit 64 is connected to the nth stage of first driving signal output terminal S(n); the first energy storage circuit 64 is used to store electrical energy;

The first terminal of the second energy storage circuit 65 is electrically connected to the first node N1, the second terminal of the second energy storage circuit 65 is electrically connected to the fifth voltage terminal V5, and the second energy storage circuit 65 is used to store electric energy;

The output circuit 66 is respectively connected to the first node N1, the second node N2, the output clock signal terminal Go, the fifth voltage terminal V5 and the nth stage of first driving signal output terminal S(n), is configured to output the fifth voltage signal provided by the fifth voltage terminal V5 to the nth stage of first driving signal output terminal S(n) under the control of the potential of the first node N1, and output the output clock signal to the nth stage of first driving signal output terminal S(n) under the control of the potential of the second node N2.

In at least one embodiment of the present disclosure, the fifth voltage terminal V5 may be the second high voltage terminal, and the sixth voltage terminal V6 may be the second low voltage terminal, but not limited thereto.

Optionally, the first node control circuit includes a first control transistor and a second control transistor;

A control electrode of the first control transistor is electrically connected to the control clock signal terminal, a first electrode of the first control transistor is electrically connected to a sixth voltage terminal, and a second electrode of the first control transistor is electrically connected to the first node;

A control electrode of the second control transistor is electrically connected to the control node, a first electrode of the second control transistor is electrically connected to the control clock signal terminal, and a second electrode of the second control transistor is electrically connected to the first node;

A control node control circuit includes a third control transistor, a fourth control transistor and a fifth control transistor;

A control electrode of the third control transistor is electrically connected to the control clock signal terminal, a first electrode of the third control transistor is electrically connected to the input terminal, and a second electrode of the third control transistor is electrically connected to the control node;

A control electrode of the fourth control transistor is electrically connected to the first node, and a first electrode of the fourth control transistor is electrically connected to a fifth voltage terminal;

A control electrode of the fifth control transistor is electrically connected to the output clock signal terminal, a first electrode of the fifth control transistor is electrically connected to a second electrode of the fourth control transistor, and a second electrode of the fifth control transistor is electrically connected to the control node;

The second node control circuit includes a sixth control transistor;

A control electrode of the sixth control transistor is electrically connected to the sixth voltage terminal, a first electrode of the sixth control transistor is electrically connected to the control node, and a second electrode of the sixth control transistor is electrically connected to the second node;

The first energy storage circuit includes a first capacitor, and the second energy storage circuit includes a second capacitor;

A first terminal of the first capacitor is electrically connected to the second node, and a second terminal of the first capacitor is electrically connected to the nth stage of first driving signal output terminal;

A first terminal of the second capacitor is electrically connected to the first node, and a second terminal of the second capacitor is electrically connected to the fifth voltage terminal;

The output circuit includes a first output transistor and a second output transistor;

A control electrode of the first output transistor is electrically connected to the first node, a first electrode of the first output transistor is electrically connected to the fifth voltage terminal, and a second electrode of the first output transistor is electrically connected to the nth stage of first driving signal output terminal;

A control electrode of the second output transistor is electrically connected to the second node, a first electrode of the second output transistor is electrically connected to the nth stage of first driving signal output terminal, and a second electrode of the second output transistor is electrically connected to the output clock signal terminal.

Figure 11:
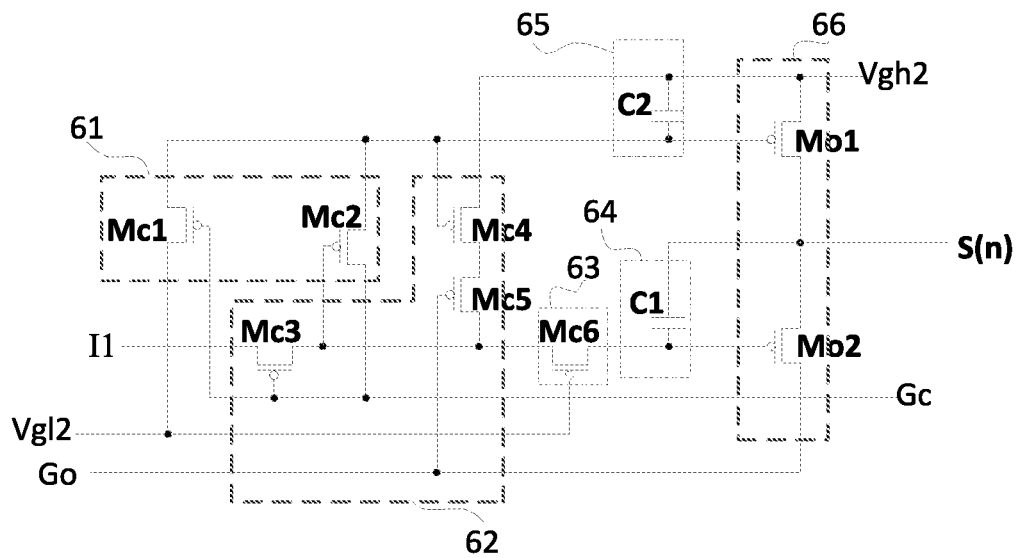
FIG. 11 is a circuit diagram of the nth stage of first driving sub-circuit.

As shown in FIG. 11, on the basis of the nth first driving sub-circuit shown in FIG. 10, The first node control circuit 61 includes a first control transistor Mc1 and a second control transistor Mc2;

The gate electrode of the first control transistor Mc1 is electrically connected to the control clock signal terminal Gc, the source electrode of the first control transistor Mc1 is electrically connected to the second low voltage terminal Vgl2, and the drain electrode of the first control transistor Mc1 is electrically connected to the first node N1;

The gate electrode of the second control transistor Mc2 is electrically connected to the control node N0, the source electrode of the second control transistor Mc2 is electrically connected to the control clock signal terminal Gc, and the drain electrode of the second control transistor Mc2 electrically connected to the first node N1;

The control node control circuit 62 includes a third control transistor Mc3, a fourth control transistor Mc4 and a fifth control transistor Mc5;

The gate electrode of the third control transistor Mc3 is electrically connected to the control clock signal terminal Gc, the source electrode of the third control transistor Mc3 is electrically connected to the input terminal 11, and the drain electrode of the third control transistor Mc3 electrically connected to the control node N0;

The gate electrode of the fourth control transistor Mc4 is electrically connected to the first node N1, and the drain electrode of the fourth control transistor Mc4 is electrically connected to the second high voltage terminal Vgh2;

The gate electrode of the fifth control transistor Mc5 is electrically connected to the output clock signal terminal Go, the source electrode of the fifth control transistor Mc5 is electrically connected to the drain electrode of the fourth control transistor Mc4, and the drain electrode of the fifth control transistor Mc5 is electrically connected to the control node N0;

The second node control circuit 63 includes a sixth control transistor Mc6;

The gate electrode of the sixth control transistor Mc6 is electrically connected to the second low voltage terminal Vgl2, the source electrode of the sixth control transistor Mc6 is electrically connected to the control node N0, and the drain electrode of the sixth control transistor Mc6 is electrically connected to the second node N2;

The first energy storage circuit 64 includes a first capacitor C1, and the second energy storage circuit 65 includes a second capacitor C2;

A first terminal of the first capacitor C1 is electrically connected to the second node N2, and a second terminal of the first capacitor C1 is electrically connected to the nth stage of first driving signal output terminal S(n);

The first terminal of the second capacitor C2 is electrically connected to the first node N1, and the second terminal of the second capacitor C2 is electrically connected to the second high voltage terminal Vgh2;

The output circuit 66 includes a first output transistor Mo1 and a second output transistor Mo2;

The gate electrode of the first output transistor Mo1 is electrically connected to the first node N1, the source electrode of the first output transistor Mo1 is electrically connected to the second high voltage terminal Vgh2, and the drain electrode of the first output transistor Mo2 is electrically connected to the nth stage of first driving signal output terminal S(n);

The gate electrode of the second output transistor Mo2 is electrically connected to the second node N2, and the source electrode of the second output transistor Mo2 is electrically connected to the nth stage of first driving signal output terminal S(n), the drain electrode of the second output transistor Mo2 is electrically connected to the output clock signal terminal Go.

In at least one embodiment of the nth stage of first driving sub-circuit shown in FIG. 11, the fifth voltage terminal may be the second high voltage terminal Vgh2, and the sixth voltage terminal may be the second low voltage terminal Vgl2, but not limited thereto.

In at least one embodiment of the nth stage of first driving sub-circuit shown in FIG. 11, all transistors are p-type transistors, but not limited thereto.

Figure 12:
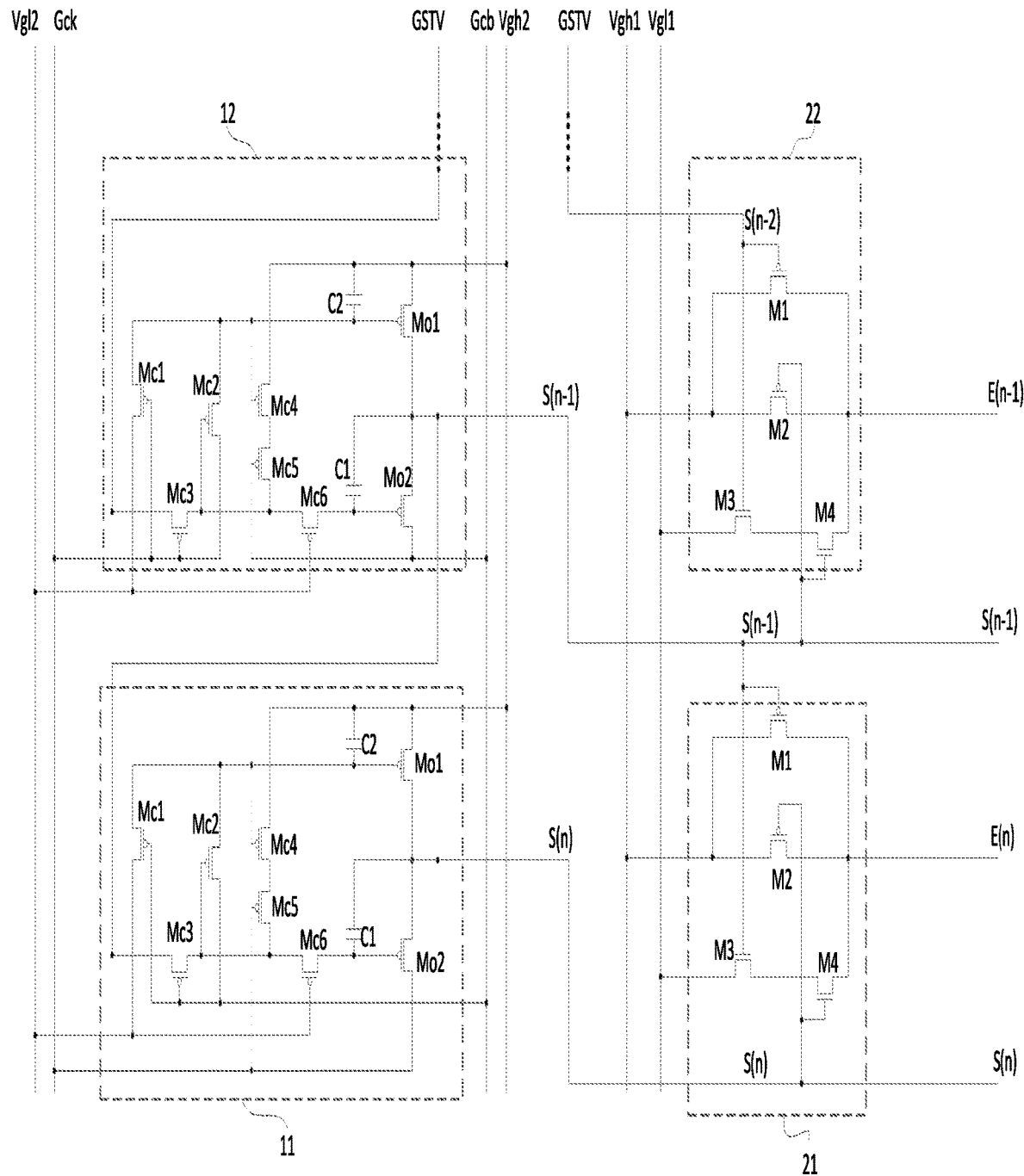
FIG. 12 is a schematic diagram of the connection between of the nth stage of first driving sub-circuit 11 and the nth stage of first conversion sub-circuit 21, and the connection between the (n−1)th stage of first driving sub-circuit 12 and the (n−1)th stage of first conversion sub-circuit 22.

FIG. 12 is a schematic diagram of the connection between the nth stage of first driving sub-circuit 11 and the nth first conversion sub-circuit 21, and the connection between the (n−1)th stage of first driving sub-circuit 12 and the (n−1)th first conversion sub-circuit 22;

In FIG. 12, the one labeled S(n−1) is the (n−1)th stage of first driving signal output terminal, and the one labeled S(n) is the nth stage of first driving signal output terminal, the one labeled S(n−2) is the (n−2)th stage of first driving signal output terminal; the one labeled E(n−1) is the (n−1)th stage of second driving signal output terminal of, and the one labeled E(n) is the nth stage of second driving signal output terminal.

In at least one embodiment shown in FIG. 12, the input terminal of the (n−1)th stage of first driving sub-circuit 12 is electrically connected to the start voltage terminal GSTV, and the input terminal of the nth stage of first driving sub-circuit 11 is connected to S(n−1);

In the (n−1)th stage of first driving sub-circuit, the control clock signal terminal is electrically connected to the first clock signal terminal Gck, and the output clock signal terminal is electrically connected to the second clock signal terminal Gcb;

In the nth stage of first driving sub-circuit, the control clock signal terminal is electrically connected to the second clock signal terminal Gcb, and the output clock signal terminal is electrically connected to the first clock signal terminal Gck.

In actual operation, pixel circuit design has begun to integrate the advantages of PMOS transistors and NMOS transistors (for example, combining low temperature poly-silicon (LTPS) with indium gallium zinc oxide (IGZO) technology to form low temperature oxide (LTPO) 7T1C pixel circuit or 8T1C pixel circuit), out two types of transistors are layout in the same pixel circuit. In this design trend, two switching signals are required for the PMOS transistor and the NMOS transistor respectively, and the two switching signals are asynchronous. Therefore, the embodiment of the present disclosure can generate a third driving signal by using the second conversion circuit, and the third driving signal is a switching signal provided to the p-type transistor in the pixel circuit.

Figure 13:
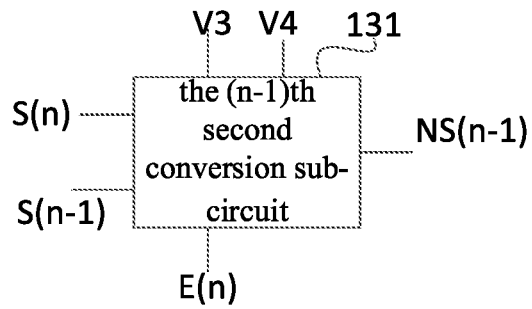
FIG. 13 is a structural diagram of the (n−1)th second conversion sub-circuit.

The driving module according to at least one embodiment of the present disclosure further includes a second conversion circuit; the second conversion circuit includes a plurality of second conversion sub-circuits;

As shown in FIG. 13, the (n−1)th second conversion sub-circuit 131 is respectively connected to the (n−1)th stage of first driving signal output terminal S(n−1) and the nth stage of first driving signal output terminal S(n), the nth stage of second driving signal output terminal E(n), the third voltage terminal V3, the fourth voltage terminal V4 and the (n−1)th stage of third driving signal output terminal NS(n−1), is configured to control the (n−1)th stage of third driving signal output terminal NS(n−1) to output the (n−1)th stage of third driving signal under the control of the (n−1)th stage of first driving signal, the nth stage of first driving signal and the nth stage of second driving signal, according to the third voltage signal provided by the third voltage terminal V3 and the fourth voltage signal provided by the fourth voltage terminal V4.

Figure 14:
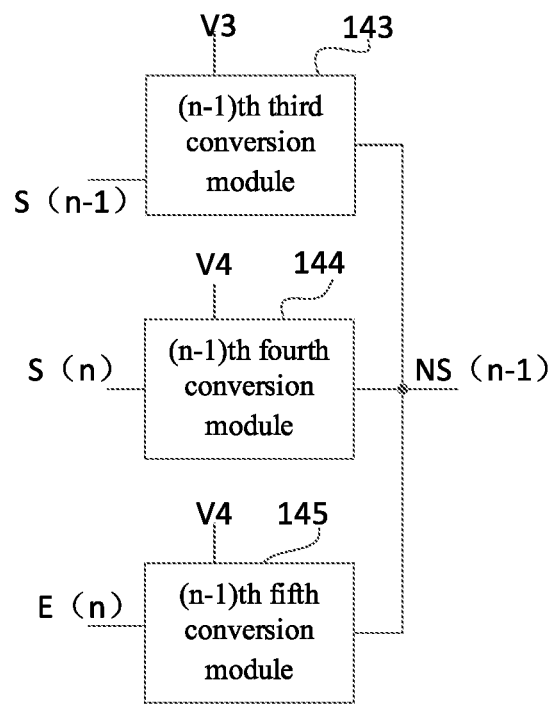
FIG. 14 is a structural diagram of the (n−1)th second conversion sub-circuit.

In at least one embodiment of the present disclosure, as shown in FIG. 14, the (n−1)th second conversion sub-circuit may include an (n−1)th third conversion module 143 and an (n−1)th fourth conversion module 144 and the (n−1)th fifth conversion module 145;

The (n−1)th third conversion module 143 is respectively connected to the (n−1)th stage of first driving signal output terminal S(n−1), the third voltage terminal V3 and the (n−1)th stage of third driving signal output terminal NS (n−1), is configured to output the third voltage signal provided by the third voltage terminal V3 to the (n−1)th stage of third driving signal output terminals NS (n−1) under the control of the (n−1)th stage of first driving signal;

The (n−1)th fourth conversion module 144 is respectively connected to the nth stage of first driving signal output terminal S(n), the fourth voltage terminal V4 and the (n−1)th stage of third driving signal output terminal NS (n−1), is configured to output the fourth voltage signal provided by the fourth voltage terminal V4 to the (n−1)th stage of third driving signal output terminal NS(n−1) under the control of the nth stage of first driving signal;

The (n−1)th fifth conversion module 145 is respectively connected to the nth stage of second driving signal output terminal E(n), the fourth voltage terminal V4 and of the (n−1)th stage of third driving signal output terminal NS (n−1), is configured to output the fourth voltage signal provided by the fourth voltage terminal V4 to the (n−1)th stage of third driving signal output terminal NS(n−1) under the control of the nth stage of second driving signal.

In at least one embodiment of the present disclosure, the fourth voltage terminal may be the third low voltage terminal, and the third voltage terminal may be the third high voltage terminal, but not limited thereto.

In at least one embodiment of the (n−1)th second conversion sub-circuit shown in FIG. 14, the (n−1)th third conversion module 143 outputs the third voltage signal to the (n−1)th stage of third driving signal output terminal NS(n−1) under the control of the (n−1)th stage of first driving signal; the (n−1)th fourth conversion module 144 outputs the fourth voltage signal to the (n−1)th stage of third driving signal output terminal NS(n−1) under the control of the nth stage of first driving signal; the (n−1)th fifth conversion module 145 outputs the fourth voltage signal to the (n−1)th stage of third driving signal output terminal NS(n−1) under the control of the nth stage of second driving signal.

Optionally, the (n−1)th third conversion module includes a fifth transistor, the (n−1)th fourth conversion module includes a sixth transistor, and the (n−1)th fifth conversion module includes a seventh transistor;

A control electrode of the fifth transistor is electrically connected to the (n−1)th stage of first driving signal output terminal, a first electrode of the fifth transistor is electrically connected to the third voltage terminal, and a second electrode of the fifth transistor is electrically connected to the (n−1)th stage of third driving signal output terminal;

A control electrode of the sixth transistor is electrically connected to the nth stage of first driving signal output terminal, a first electrode of the sixth transistor is electrically connected to the fourth voltage terminal, and a second electrode of the sixth transistor is electrically connected to the (n−1)th stage of third driving signal output terminal;

A control electrode of the seventh transistor is electrically connected to the nth stage of second driving signal output terminal, a first electrode of the seventh transistor is electrically connected to the fourth voltage terminal, and a second electrode of the seventh transistor is electrically connected to the (n−1)th stage of third driving signal output terminal.

Optionally, the fifth transistor, the sixth transistor and the seventh transistor are all transistors of the first type.

Figure 15:
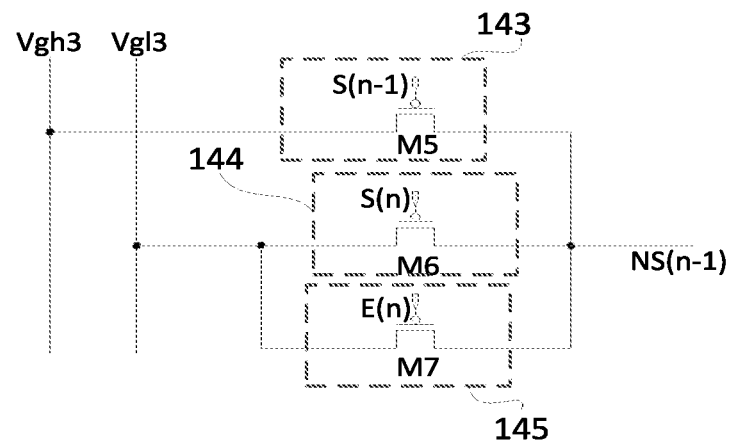
FIG. 15 is a circuit diagram of the (n−1)th second conversion sub-circuit.

As shown in FIG. 15, on the basis of at least one embodiment of the (n−1)th second conversion sub-circuit shown in FIG. 14, the (n−1)th third conversion module 143 includes a fifth transistor M5, the (n−1)th fourth conversion module 144 includes a sixth transistor M6, and the (n−1)th fifth conversion module 145 includes a seventh transistor M7;

The gate electrode of the fifth transistor M5 is electrically connected to the (n−1)th stage of first driving signal output terminal S(n), and the source electrode of the fifth transistor M5 is electrically connected to the third high voltage terminal Vgh3, the drain electrode of the fifth transistor M5 is electrically connected to the (n−1)th stage of third driving signal output terminal NS(n−1);

The gate electrode of the sixth transistor M6 is electrically connected to the nth stage of first driving signal output terminal S(n), the source electrode of the sixth transistor M6 is electrically connected to the third low voltage terminal Vgl3, and the drain electrode the sixth transistor M6 is electrically connected to the (n−1)th stage of third driving signal output terminal NS(n−1);

The gate electrode of the seventh transistor M7 is electrically connected to the nth stage of second driving signal output terminal E(n), and the source electrode of the seventh transistor M7 is electrically connected to the third low voltage terminal Vgl3, the drain electrode of the seventh transistor M7 is electrically connected to the (n−1)th stage of third driving signal output terminal NS(n−1).

In at least one embodiment of the (n−1)th second conversion sub-circuit shown in 15, M5, M6 and M7 are all PMOS transistors, but not limited thereto.

In at least one embodiment of the (n−1)th second conversion sub-circuit shown in FIG. 15, the voltage value of the third high voltage signal provided by the third high voltage terminal Vgh3 may be 7V, and the voltage value of the third low voltage signal provided by the third low voltage terminal Vgl3 may be −9 V, but not limited thereto.

In the embodiment of the present disclosure, the third driving signal can be generated under the control of the first driving signal and the second driving signal under the condition of only adding three transistors, which is beneficial to realize narrow frame.

Figure 16:
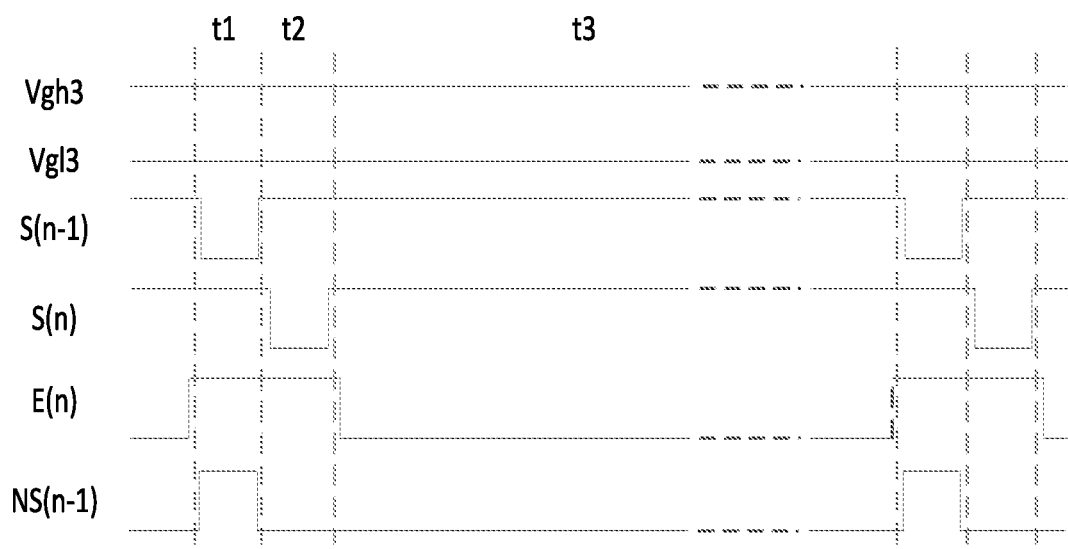
FIG. 16 is a work timing diagram of the (n−1)th second conversion sub-circuit shown in FIG. 15.

As shown in FIG. 16, when at least one embodiment of the (n−1)th second conversion sub-circuit shown in FIG. 15 is in operation, the conversion period includes a first conversion phase t1, a second conversion phase t2 and a third conversion phase t3;

In the first conversion phase t1, S(n−1) provides a low-voltage signal, S(n) provides a high-voltage signal, E(n) provides a high-voltage signal, M4 is turned on, M5 and M6 are both turned off, and the third high-voltage signal is output to NS (n−1);

In the second conversion phase t2, S(n−1) provides a high-voltage signal, S(n) provides a low-voltage signal, E(n) provides a high-voltage signal, M5 is turned off, M6 is turned on, and M7 is turned off. The third low voltage signal is output to NS(n−1);

In the third conversion phase t3, S(n−1) provides a high voltage signal, S(n) provides a high voltage signal, E(n) provides a low voltage signal, both M5 and M6 are turned off, M7 is turned on, and the third low voltage signal is output to NS(n−1).

Figure 17:
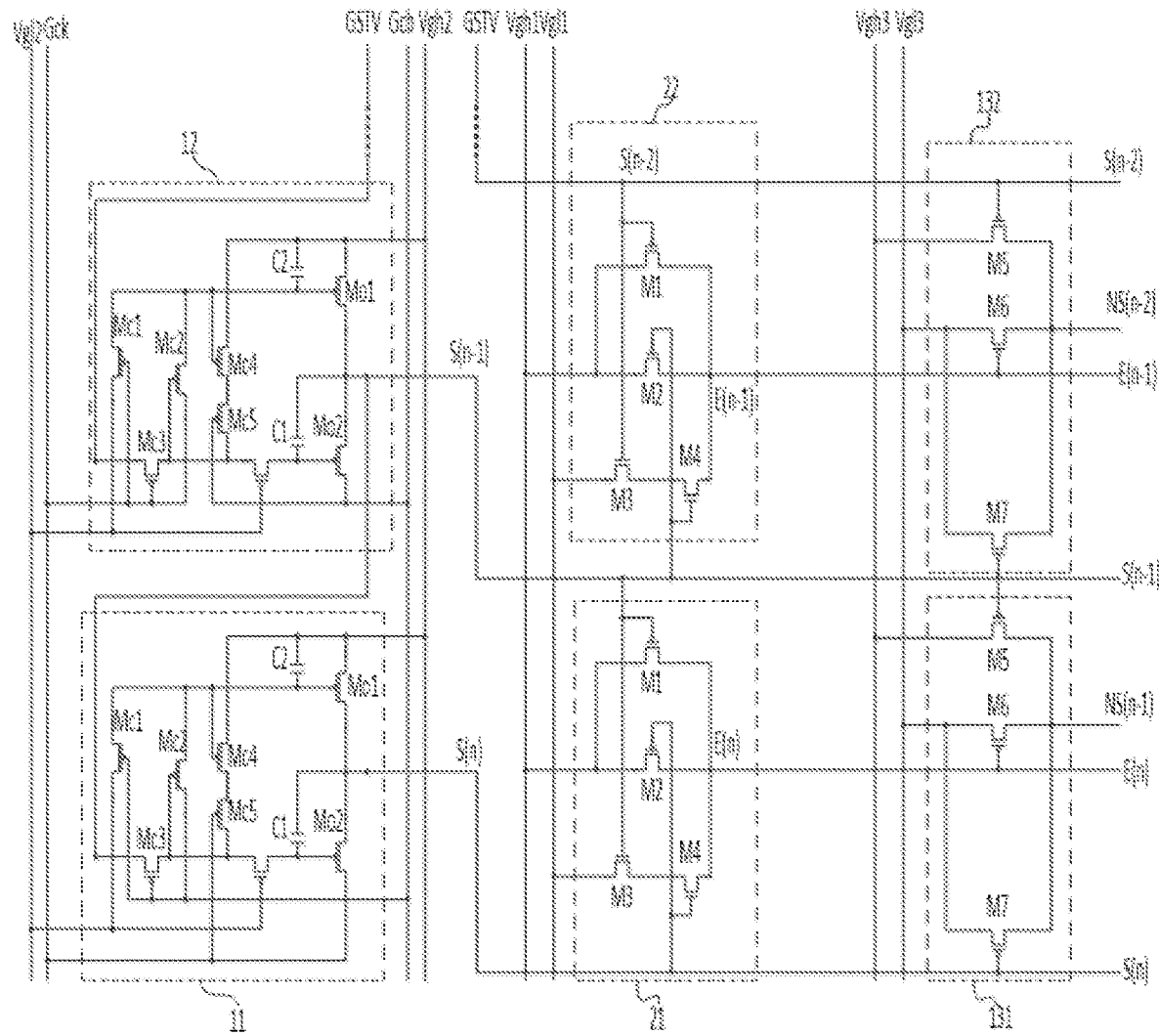
FIG. 17 is a schematic diagram of the connection among the nth stage of first driving sub-circuit 11, the nth first conversion sub-circuit 21 and the (n−1)th second conversion sub-circuit 131, and the connection among the (n−1)th stage of first driving sub-circuit 12, the (n−1)th first conversion sub-circuit 22 and the (n−2)th second conversion sub-circuit 132.

FIG. 17 is a schematic diagram of the connection among the nth stage of first driving sub-circuit 11, the nth first conversion sub-circuit 21 and the (n−1)th second conversion sub-circuit 131, and connection among the (n−1)th stage of first driving sub-circuit 12, the (n−1)th first conversion sub-circuit 22 and the (n−2)th second conversion sub-circuit 132;

In FIG. 17, the one labeled S(n−1) is of (n−1)th stage of first driving signal output terminal, and the one labeled S(n) is the nth stage of first driving signal output terminal, and the one label is S(n−2) is the (n−2)th stage of first driving signal output terminal; the one labeled E(n−1) is the (n−1)th stage of second driving signal output terminal, and the one labeled E(n) is the nth stage of second driving signal output terminal; the one labeled NS (n−2) is the (n−2)th stage of third driving signal output terminal; the one labeled NS (n−1) is the (n−1)th stage of third driving signal output terminal.

In at least one embodiment shown in FIG. 17, the input terminal of the (n−1)th stage of first driving sub-circuit 12 is electrically connected to the start voltage terminal GSTV, and the input terminal of the nth stage of first driving sub-circuit 11 is connected to S(n−1);

In the (n−1)th stage of first driving sub-circuit, the control clock signal terminal is electrically connected to the first clock signal terminal Gck, and the output clock signal terminal is electrically connected to the second clock signal terminal Gcb;

In the nth stage of first driving sub-circuit, the control clock signal terminal is electrically connected to the second clock signal terminal Gcb, and the output clock signal terminal is electrically connected to the first clock signal terminal Gck.

In at least one embodiment of the present disclosure, the voltage value of the first high voltage signal, the voltage value of the second high voltage signal and the voltage value of the third high voltage signal may be the same or different;

The voltage value of the first low voltage signal, the voltage value of the second low voltage signal and the voltage value of the third low voltage signal may be the same or different.

The display panel described in the embodiment of the present disclosure includes the driving module arranged in the peripheral area and N rows and M columns of pixel circuits arranged in the display area; N and M are positive integers;

The driving module is used to provide driving signals for the pixel circuits.

In at least one embodiment of the present disclosure, the driving signal includes a first driving signal and a second driving signal;

The first driving circuit included in the driving module is arranged on a side of the first conversion circuit included in the driving module away from the display area.

Figure 18:
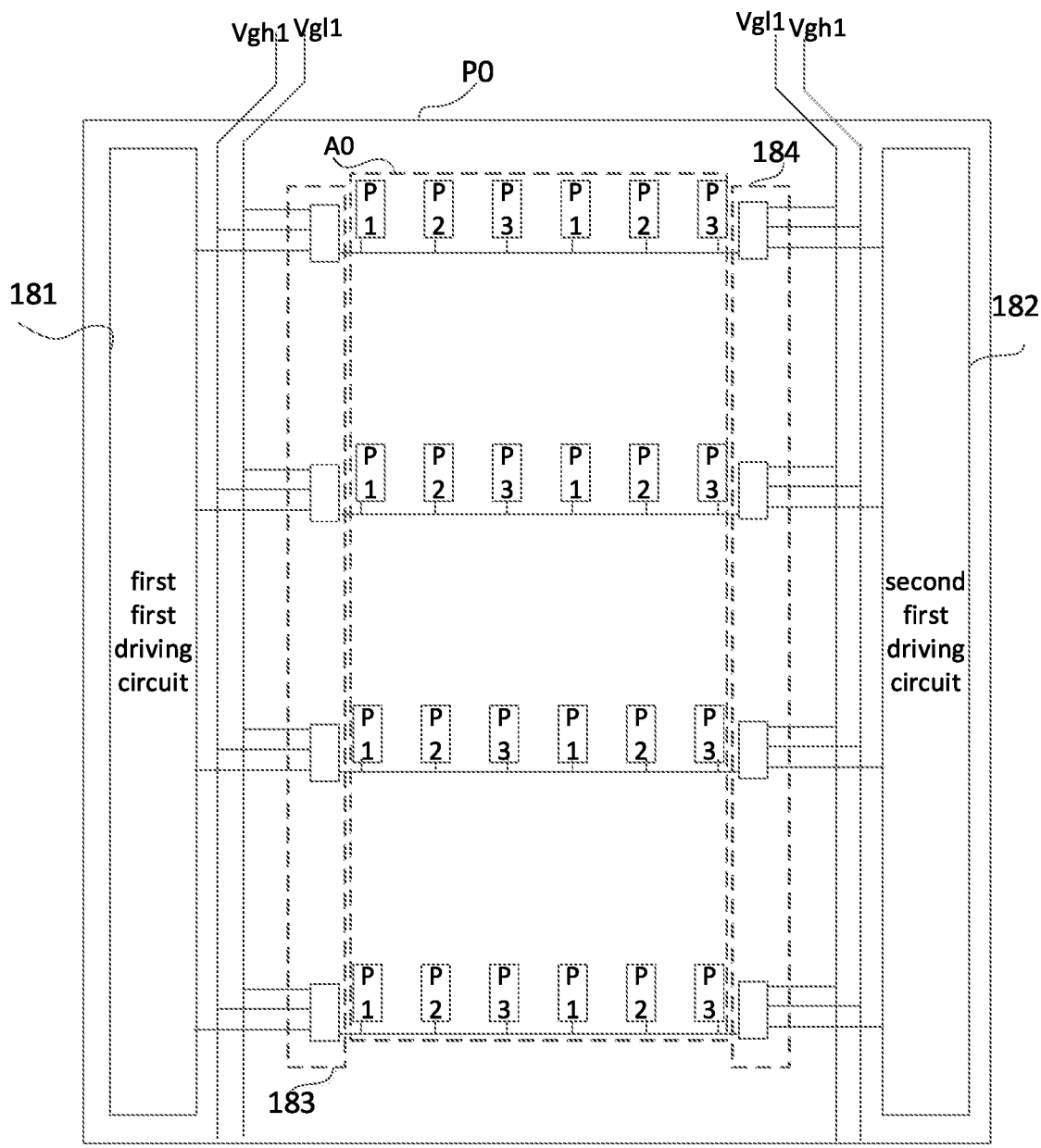
FIG. 18 is a schematic structural diagram of a display panel according to at least one embodiment of the present disclosure.

As shown in FIG. 18, in at least one embodiment of the present disclosure, the reference number 181 is the first first driving circuit, and the reference number 182 is the second first driving circuit. The first first driving circuit 181 is arranged on the left side of the display area A0, the second first driving circuit 182 is arranged on the right side of the display area A0;

The first first conversion circuit 183 is arranged between the first first driving circuit 181 and the display area A0, and the second first conversion circuit 184 is arranged between the second first driving circuit 182 and the display area A0;

In FIG. 18, the one marked P1 is a red pixel circuit, the one marked P2 is a green pixel circuit, the one marked P3 is a blue pixel circuit, and the one marked P0 is a display panel.

In at least one embodiment of the present disclosure, the driving signal further includes a third driving signal; the driving module further includes a second conversion circuit;

The second conversion circuit is arranged on a side of the first conversion circuit close to the display area.

In specific implementation, when the driving module further includes a second conversion circuit, the second conversion circuit may be arranged between the first conversion circuit and the display area, but not limited thereto; in actual operation, the second converting circuit can also be arranged between the first converting circuit and the first driving circuit.

Optionally, the nth row and mth column of pixel circuit includes nth row and mth column of data writing-in circuit, nth row and mth column of compensation control circuit, nth row and mth column of first reset circuit, nth row and mth column of the second reset circuit, the nth row and mth column of the first light emitting control circuit, the nth row and mth column of the second light emitting control circuit, the nth row and mth column of driving circuit, the nth row and the mth column of third energy storage circuit and the nth row and the mth column of light-emitting element; n is a positive integer less than or equal to N, and m is a positive integer less than or equal to M;

The nth row and mth column of data writing-in circuit is respectively electrically connected to the nth stage of first driving signal output terminal, the mth column of data line and the first terminal of the nth row and mth column of driving circuit, is configured to write the data voltage provided by the mth column of data line into the first terminal of the nth row and mth column of pixel circuit under the control of the nth stage of first driving signal provided by the nth driving signal output terminal;

The nth row and mth column of compensation control circuit is respectively connected to the nth stage of first driving signal output terminal, the control terminal of the nth row and mth column of driving circuit, and the second terminal of the nth row and mth column of driving circuit, and is used to control to connect the control terminal of the nth row and mth column of driving circuit and the second terminal of the nth row and mth column of driving circuit under the control of the nth stage of first driving signal;

The nth row and the mth column of first reset circuit in is electrically connected to the (n−1)th stage of first driving signal output terminal, the control terminal of the nth row and the mth column of driving circuit and the first initial voltage terminal, is configured to write the first initial voltage provided by the first initial voltage terminal into the control terminal of the nth row and the mth column of the driving circuit under the control of the (n−1)th stage of first driving signal provided by the (n−1)th stage of first driving signal output terminal;

The nth row and mth column of second reset circuit is electrically connected to the nth stage of first driving signal output terminal, the first electrode of the nth row and mth column of the light emitting element and the second initial voltage terminal, respectively, is configured to write the second initial voltage provided by the second initial voltage terminal into the first electrode of the nth row and mth column of the light-emitting element under the control of the nth stage of first driving signal;

The control terminal of the nth row and the mth column of the first light-emitting control circuit is electrically connected to the nth second driving signal output terminal or the (n+1)th second driving signal output terminal; the nth row and the mth column of the first light emitting control circuit is also electrically connected to the first level terminal and the first terminal of the nth row and mth column of driving circuit respectively, and is configured to connect the first level terminal and the first terminal of the nth row and mth column of driving circuit under the control of the nth second driving signal provided by the nth second driving signal output terminal and the control of the (n+1)th second driving signal provided by the (n+1)th second driving signal output terminal;

The the nth row and mth column of second light emitting control circuit is respectively connected to the nth stage of second driving signal output terminal, the second terminal of the nth row and mth column of driving circuit and the first electrode of the nth row and mth column of the light emitting element, and is used to control to connect the second terminal of the nth row and mth column of driving circuit and the first electrode of the nth row and mth column of the light emitting element under the control of the nth stage of second driving signal;

The the nth row and the mth column of driving circuit is used to generate a driving current under the control of the potential of the control terminal thereof;

The nth row and mth column of third energy storage circuit is electrically connected to the control terminal of the nth row and mth column of driving circuit and the first level terminal, is configured to store electric energy;

The second electrode of the nth row and mth column of the light emitting element is electrically connected to the second level terminal.

In at least one embodiment of the present disclosure, the first initial voltage terminal and the second initial voltage terminal may be the same initial voltage terminal, or may be different initial voltage terminals.

In at least one embodiment of the present disclosure, the first level terminal may be a high level terminal, and the second level terminal may be a low level terminal, but not limited thereto.

Figure 19:
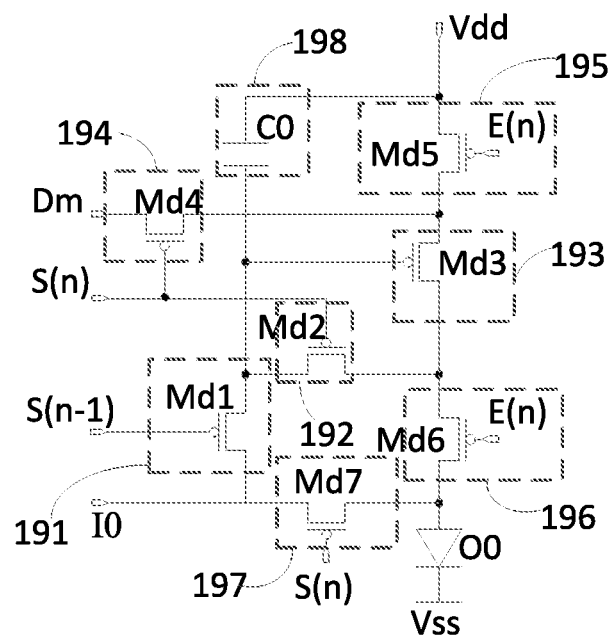
FIG. 19 is a circuit diagram of the nth row and the mth column of pixel circuit.

As shown in FIG. 19, the the nth row and mth column of first reset circuit 191 includes a first display control transistor Md1, the nth row and mth column of compensation control circuit 192 includes a second display control transistor Md2, and the nth row and mth column of driving circuit 193 includes a driving transistor Md3, the nth row and the mth column of data writing-in circuit 194 includes a fourth display control transistor Md4, the nth row and the mth column of the first light emitting control circuit 195 includes a fifth display control transistor Md5, and the nth row and the mth column of the second light emitting control circuit 196 includes the sixth display control transistor Md6, and the the nth row and m column of second reset circuit 197 includes a seventh display control transistor Md7; the nth row and the mth column of light emitting element is the nth row and mth column of organic light emitting diode O0; the the nth row and mth column of third energy storage circuit 198 includes a storage capacitor C0;

The gate electrode of Md1 is electrically connected to the (n−1)th stage of first driving signal output terminal S(n−1), the source electrode of Md1 is electrically connected to the initial voltage terminal I0, and the drain electrode of Md1 is electrically connected to the gate electrode of Md3;

The gate electrode of Md2 is electrically connected to the nth stage of first driving signal output terminal S(n), the source electrode of Md2 is electrically connected to the gate electrode of Md3, and the drain electrode of Md2 is electrically connected to the drain electrode of Md3;

The gate electrode of Md4 is electrically connected to the nth stage of first driving signal output terminal S(n), the source electrode of Md4 is electrically connected to the mth column of the data line Dm, and the drain electrode of Md4 is electrically connected to the source electrode of Md3;

The gate electrode of Md5 is electrically connected to the nth stage of second driving signal output terminal E(n), the source electrode of Md5 is electrically connected to the high level terminal Vdd, and the drain electrode of Md5 is electrically connected to the source electrode of Md3;

The gate electrode of Md6 is electrically connected to the nth stage of second driving signal output terminal E(n), the source electrode of Md6 is electrically connected to the drain electrode of Md3, the drain electrode of Md6 is electrically connected to the anode of O0; the cathode of O0 is electrically connected to the low level terminal Vss;

The gate electrode of Md7 is electrically connected to the nth stage of first driving signal output terminal S(n), the source electrode of Md7 is electrically connected to the initial voltage terminal I0, and the drain electrode of Md7 is electrically connected to the drain electrode of Md6;

The first terminal of C0 is electrically connected to the high level terminal Vdd, and the second terminal of C0 is electrically connected to the gate electrode of Md3.

In at least one embodiment of the pixel circuit shown in FIG. 19, all transistors are PMOS transistors, so only the first driving circuit and the first conversion circuit need to be used, and the pixel can be controlled without using the second conversion circuit, which is conducive to the realization of narrow frame.

Figure 20:
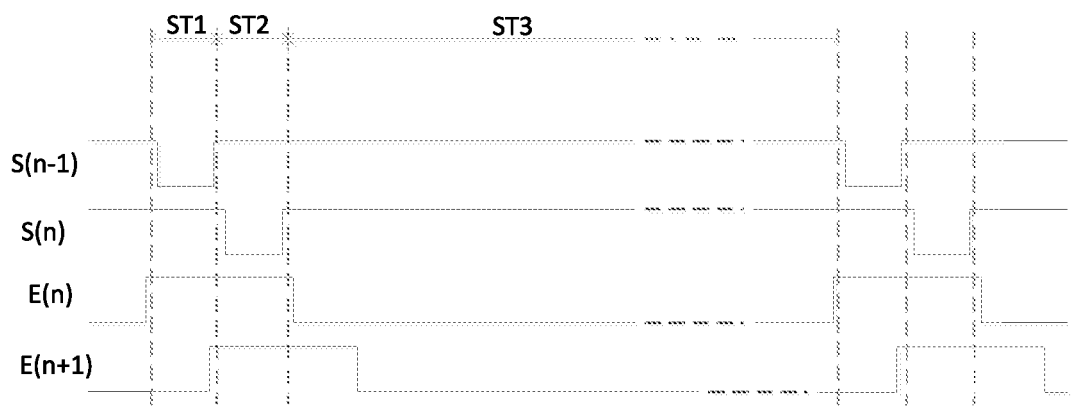
FIG. 20 is a work timing diagram of the nth row and the mth column of pixel circuit shown in FIG. 19.

As shown in FIG. 20, when at least one embodiment of the pixel circuit shown in FIG. 19 is in operation, the display period includes an initialization phase ST1, a data writing-in phase ST2 and a light emitting phase ST3 which are set successively;

In the initialization phase ST1, S(n−1) provides a low voltage signal, S(n) provides a high voltage signal, E(n) provides a high voltage signal, Md1 is turned on, and I0 provides an initial voltage Vinit to write Vinit into the gate electrode of Md3, so that at the beginning of the data writing-in phase ST2, Md3 can be turned on;

In the initialization phase ST1, Md2, Md3, Md4, Md5, Md6 and Md7 are all turned off;

In the data writing-in phase ST2, S(n−1) provides a high voltage signal, S(n) provides a low voltage signal, E(n) provides a high voltage signal, both Md2 and Md4 are turned on, and Dm provides the data voltage Vdata to write Vdata into the source electrode of Md3, and control to connect the gate electrode of Md3 and the drain electrode of Md3; Md7 is turned on, and I0 provides the initial voltage Vinit to write Vinit into the anode of O0 to control O0 not to emit light, and eliminate the remaining charge on the anode of O0;

At the beginning of the data writing-in phase ST2, Md3 is turned on, and C0 is charged by Vdata to increase the potential of the gate electrode of Md3 until Md3 is turned off. At this time, the potential of the gate electrode of Md3 is Vdata+Vth, wherein, Vth is the threshold voltage of Md3;

In the data writing-in phase ST2, Md1, Md5 and Md6 are all turned off;

In the light emitting phase ST3, S(n−1) provides a high voltage signal, S(n) provides a high voltage signal, E(n) provides a low voltage signal, Md3, Md5 and Md6 are all turned on, and Md3 drives O0 to emit light;

In the light emitting phase ST3, Md1, Md2, Md4 and Md7 are all turned off.

Figure 21:
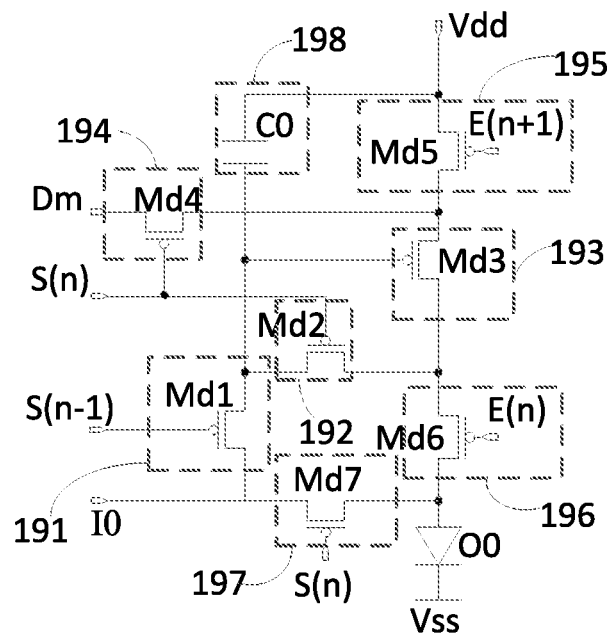
FIG. 21 is a circuit diagram of the nth row and the mth column of pixel circuit.

As shown in FIG. 21, the nth row and mth column of first reset circuit 191 includes a first display control transistor Md1, the nth row and mth column of compensation control circuit 192 includes a second display control transistor Md2, and the nth row and mth column of driving circuit 193 includes a driving transistor Md3, the nth row and the mth column of data writing-in circuit 194 includes the fourth display control transistor Md4, the nth row and the mth column of the first light emitting control circuit 195 includes the fifth display control transistor Md5, and the nth row and the mth column of the second light emitting control circuit 196 includes the sixth display control transistor Md6, and the nth row and m column of the second reset circuit 197 includes the seventh display control transistor Md7; the nth row of the mth column of light emitting element is the nth row of the mth column of organic light emitting diode O0; the nth row and mth column of the third energy storage circuit 198 includes a storage capacitor C0;

The gate electrode of Md1 is electrically connected to the (n−1)th stage of first driving signal output terminal S(n−1), the source electrode of Md1 is electrically connected to the initial voltage terminal I0, and the drain electrode of Md1 is electrically connected to the gate electrode of Md3;

The gate electrode of Md2 is electrically connected to the nth stage of first driving signal output terminal S(n), the source electrode of Md2 is electrically connected to the gate electrode of Md3, and the drain electrode of Md2 is electrically connected to the drain electrode of Md3;

The gate electrode of Md4 is electrically connected to the nth stage of first driving signal output terminal S(n), the source electrode of Md4 is electrically connected to the mth column of the data line Dm, and the drain electrode of Md4 is electrically connected to the source electrode of Md3;

The gate electrode of Md5 is electrically connected to the (n+1)th stage of second driving signal output terminal E(n+1), the source electrode of Md5 is electrically connected to the high level terminal Vdd, and the drain electrode of Md5 is electrically connected to the source electrode of Md3;

The gate electrode of Md6 is electrically connected to the nth stage of second driving signal output terminal E(n), the source electrode of Md6 is electrically connected to the drain electrode of Md3, the drain electrode of Md6 is electrically connected to the anode of O0; the cathode of O0 is electrically connected to the low level terminal Vss;

The gate electrode of Md7 is electrically connected to the nth stage of first driving signal output terminal S(n), the source electrode of Md7 is electrically connected to the initial voltage terminal I0, and the drain electrode of Md7 is electrically connected to the drain electrode of Md6;

The first terminal of C0 is electrically connected to the high level terminal Vdd, and the second terminal of C0 is electrically connected to the gate electrode of Md3.

In at least one embodiment of the pixel circuit shown in FIG. 21, all transistors are PMOS transistors, so only the first driving circuit and the first conversion circuit need to be used, and the pixel can be controlled without using the second conversion circuit, which is conducive to the realization of narrow frame.

In at least one embodiment of the pixel circuit shown in FIG. 21, the gate electrode of Md5 is electrically connected to E(n+1), and the gate electrode of Md6 is electrically connected to E(n), so as to improve short term afterimages.

Figure 22:
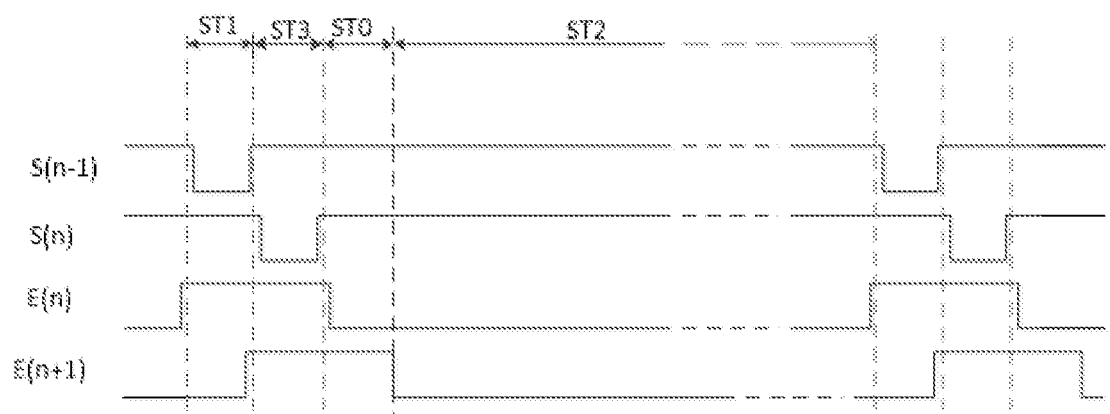
FIG. 22 is a work timing diagram of the nth row and the mth column of pixel circuit shown in FIG. 21.

As shown in FIG. 22, when at least one embodiment of the pixel circuit shown in FIG. 21 is in operation, the display period includes an initialization phase ST1, a data writing-in phase ST2, a light emitting preparation phase ST0, and a light emitting phase ST3;

In the initialization phase ST1, S(n−1) provides a low voltage signal, S(n) provides a high voltage signal, E(n) provides a high voltage signal, E(n+1) provides a low voltage signal, Md1 is turned on, I0 providing an initial voltage Vinit to write Vinit into the gate electrode of Md3, so that Md3 can be turned on at the beginning of the data writing-in phase ST2;

In the initialization phase ST1, Md2, Md3, Md4, Md5, Md6 and Md7 are all turned off;

In the data writing-in phase ST2, S(n−1) provides a high voltage signal, S(n) provides a low voltage signal, E(n) provides a high voltage signal, E(n+1) provides a high voltage signal, Md2 and Md4 are turned on, Dm provides the data voltage Vdata to write Vdata into the source electrode of Md3, and controls to connect the gate electrode of Md3 and the drain electrode of Md3; Md7 is turned on, and IO provides the initial voltage Vinit to write Vinit into the anode of O0, to control O0 not to emit light, and eliminate the remaining charge on the anode of O0;

At the beginning of the data writing-in phase ST2, Md3 is turned on, and C0 is charged by Vdata to increase the potential of the gate electrode of Md3 until Md3 is turned off. At this time, the potential of the gate electrode of Md3 is Vdata+Vth, wherein, Vth is the threshold voltage of Md3;

In the data writing-in phase ST2, Md1, Md5 and Md6 are all turned off;

In the light emitting preparation phase ST0, S(n−1) provides a high voltage signal, S(n) provides a high voltage signal, E(n) provides a low voltage signal, E(n+1) provides a high voltage signal, Md6 is turned on, Md1, Md2, Md4, Md5 and Md7 are all turned off;

In the light emitting phase ST3, S(n−1) provides a high voltage signal, S(n) provides a high voltage signal, E(n) provides a low voltage signal, E(n+1) provides a low voltage signal, Md3, Md5 and Md6 are turned on, and Md3 drives O0 to emit light;

In the light emitting phase ST3, Md1, Md2, Md4 and Md7 are all turned off.

Optionally, the nth row and mth column of pixel circuit includes nth row mth column of data writing-in circuit, the nth row and mth column of on-off control circuit, the nth row and mth column of compensation control circuit, the nth row and mth column of first reset circuit, the nth row and the mth column of the second reset circuit, the nth row and mth column of the first light emitting control circuit, the nth row and mth column of the second light emitting control circuit, the nth row and the mth column of driving circuit, the nth row and the mth column of third energy storage circuit and the nth row and the mth column of light emitting element; n is a positive integer less than or equal to N, and m is a positive integer less than or equal to M;

The nth row and mth column of data writing-in circuit is respectively electrically connected to the nth stage of first driving signal output terminal, the mth column of data line and the first terminal of the nth row and mth column of driving circuit, is configured to write the data voltage provided by the mth column of data line into the first terminal of the nth row and mth column of pixel circuit under the control of the nth stage of first driving signal provided by the nth driving signal output terminal;

The nth row and the mth column of on-off control circuit is respectively electrically connected to the nth stage of third driving signal output terminal, the control terminal of the nth row and the mth column of driving circuit and the nth row and the mth column of connection node, is configured to control to connect the control terminal of the nth row and mth column of driving circuit and the nth row and mth column of connection node under the control of the nth stage of third driving signal provided by the nth stage of third driving signal output terminal;

The nth row and mth column of compensation control circuit is respectively connected to the nth stage of first driving signal output terminal, the nth row and mth column of connection node and the second terminal of the nth row and mth column of driving circuit, is configured to control to connect the nth row and mth column of connection node and the nth row and mth column of driving circuit under the control of the nth stage of first driving signal;

The nth row and the mth column of first reset circuit is electrically connected to the (n−1)th stage of first driving signal output terminal, the the nth row and the mth column of connection node and the first initial voltage terminal, and is configured to write the first initial voltage provided by the first initial voltage terminal into the nth row and mth column of connection node under the control of the (n−1)th stage of first driving signal provided by the (n−1)th stage of first driving signal output terminal;

The nth row and mth column of second reset circuit is electrically connected to the nth stage of first driving signal output terminal, the first electrode of the nth row and mth column of the light emitting element and the second initial voltage terminal, respectively, is configured to write the second initial voltage provided by the second initial voltage terminal into the first electrode of the nth row and mth column of light-emitting element under the control of the nth-stage of first driving signal;

The control terminal of the nth row and the mth column of the first light-emitting control circuit is electrically connected to the nth stage of second driving signal output terminal or the (n+1)th second driving signal output terminal; the nth row and the mth column of first light emitting control circuit is also electrically connected to the first level terminal and the first terminal of the nth row and mth column of driving circuit respectively, and is configured to control to connect the first level terminal and the first terminal of the nth row and mth column of driving circuit under the control of for the nth stage of second driving signal provided by the nth stage of second driving signal output terminal or the (n+1)th second driving signal provided by the (n+1)th second driving signal output terminal;

The nth row and mth column of second light emitting control circuit is respectively connected to the nth stage of second driving signal output terminal, the second terminal of the nth row and mth column of driving circuit and the first electrode of the nth row and mth column of the light emitting element, and is used to control to connect the second terminal of the nth row and mth column of driving circuit and the first electrode of the the nth row and mth column of light emitting element under the control of the nth stage of second driving signal;

The nth row and the mth column of driving circuit is used to generate a driving current under the control of the potential of the control terminal thereof;

The nth row and mth column of third energy storage circuit is electrically connected to the control terminal of the nth row and mth column of driving circuit and the first level terminal and is configured to store electric energy;

The second electrode of the nth row and the mth column of the light-emitting element is electrically connected to the second level terminal;

The nth stage of third driving signal output terminal and the nth stage of second driving signal output terminal are connected to the same driving signal.

Figure 23:
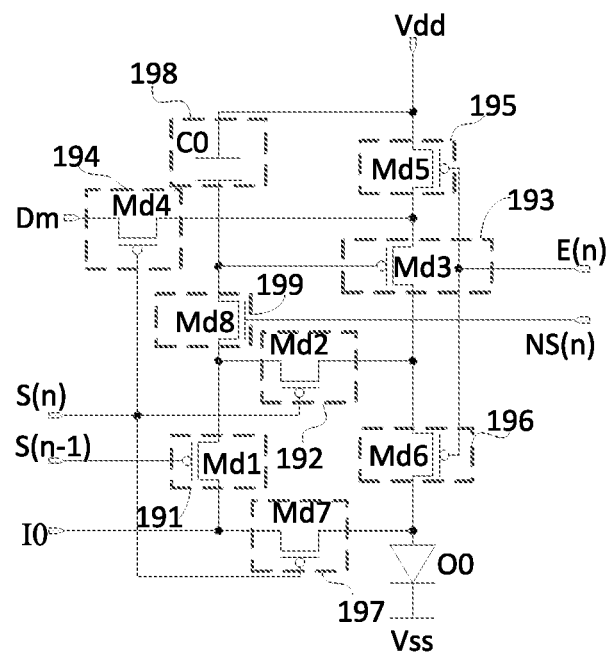
FIG. 23 is a circuit diagram of the nth row and the mth column of pixel circuit.

As shown in FIG. 23, the nth row and mth column of the first reset circuit 191 includes a first display control transistor Md1, and the nth row and mth column of compensation control circuit 192 includes a second display control transistor Md2, and the nth row and mth column of driving circuit 193 includes a driving transistor Md3, the nth row and the mth column of the data writing-in circuit 194 includes a fourth display control transistor Md4, the nth row and the mth column of the first light emitting control circuit 195 includes a fifth display control transistor Md5, and the nth row and the mth column of the second light emitting control circuit 196 includes a sixth display control transistor Md6, and the nth row and mth column of the second reset circuit 197 includes a seventh display control transistor Md7; the nth row and mth column of light emitting element is the nth row and mth column of organic light-emitting diode O0; the nth row and mth column of the third energy storage circuit 198 includes a storage capacitor C0; the nth row and mth column of on-off control circuit 199 includes an eighth display control transistor Md8;

The gate electrode of Md1 is electrically connected to the (n−1)th stage of first driving signal output terminal S(n−1), the source electrode of Md1 is electrically connected to the initial voltage terminal 10, and the drain electrode of Md1 is connected to the nth row and the mth column of connection node Nj;

The gate electrode of Md2 is electrically connected to the nth stage of first driving signal output terminal S(n), the source electrode of Md2 is electrically connected to the nth row and the mth column of the connection node Nj, and the drain electrode of Md2 is electrically connected to the drain electrode of Md3;

The gate electrode of Md4 is electrically connected to the nth stage of first driving signal output terminal S(n), the source electrode of Md4 is electrically connected to the mth column of the data line Dm, and the drain electrode of Md4 is electrically connected to the source electrode of Md3;

The gate electrode of Md5 is electrically connected to the nth stage of second driving signal output terminal E(n), the source electrode of Md5 is electrically connected to the high level terminal Vdd, and the drain electrode of Md5 is electrically connected to the source electrode of Md3;

The gate electrode of Md6 is electrically connected to the nth stage of second driving signal output terminal E(n), the source electrode of Md6 is electrically connected to the drain electrode of Md3, the drain electrode of Md6 is electrically connected to the anode of O0; the cathode of O0 is electrically connected to the low voltage level terminal Vss;

The gate electrode of Md7 is electrically connected to the nth stage of first driving signal output terminal S(n), the source electrode of Md7 is electrically connected to the initial voltage terminal 10, and the drain electrode of Md7 is electrically connected to the drain electrode of Md6;

The gate electrode of Md8 is electrically connected to the nth stage of third driving signal output terminal NS(n), the source electrode of Md8 is electrically connected to the gate electrode of Md3, and the drain electrode of Md8 is electrically connected to the nth row and the mth column of the connection node Nj;

The first terminal of C0 is electrically connected to the high level terminal Vdd, and the second terminal of C0 is electrically connected to the gate electrode of Md3.

In at least one embodiment of the nth row and the mth column of the pixel circuit shown in FIG. 23, Md1, Md2, Md3, Md4, Md5, Md6 and Md7 are all PMOS transistors, and Md8 is an NMOS transistor, but not limited thereto.

In at least one embodiment of the nth row and the mth column of the pixel circuit shown in FIG. 23, the first level terminal is the high level terminal Vdd, and the second level terminal is the low level terminal Vss;

The first initial voltage terminal and the second initial voltage terminal are the same initial voltage terminal; but not limited to this.

Figure 24:
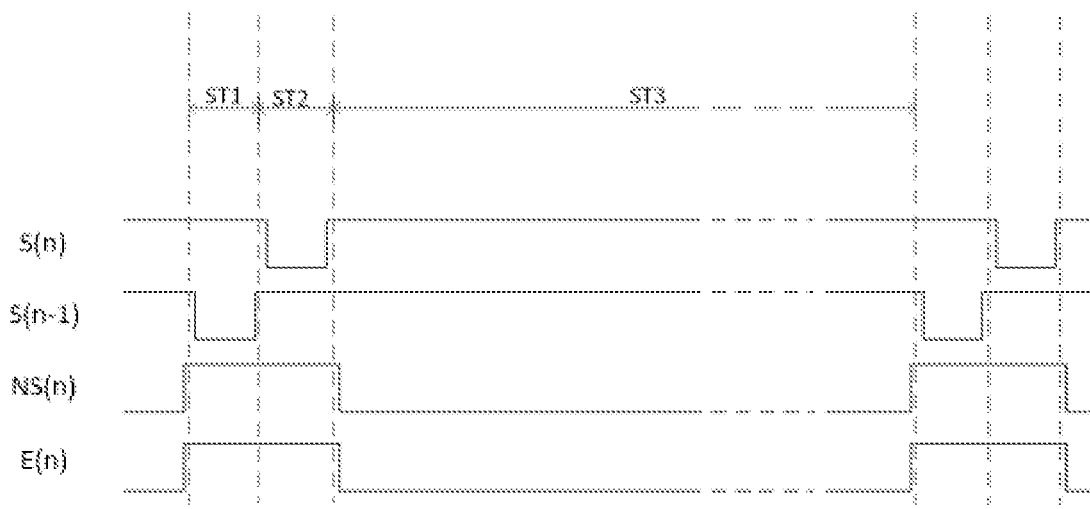
FIG. 24 is a work timing diagram of the nth row and the mth column of pixel circuit shown in FIG. 23.

As shown in FIG. 24, when the nth row and the mth column of the pixel circuit shown in FIG. 23 is in operation, the display period includes an initialization phase ST1, a data writing-in phase ST2 and a light emitting phase ST3 which are arranged successively;

In the initialization phase ST1, S(n) provides a high voltage signal, S(n−1) provides a low voltage signal, NS(n) provides a high voltage signal, E(n) provides a high voltage signal, Md1 and Md8 are turned on, I0 provides an initial voltage Vinit to write Vinit into the gate electrode of Md3, so that Md3 can be turned on at the beginning of the data writing-in phase ST2;

In the data writing-in phase ST2, S(n) provides a low voltage signal, S(n−1) provides a high voltage signal, NS(n) provides a high voltage signal, E(n) provides a high voltage signal, Md8 is turned on, Md2 Turn on, Md4 is turned on, Dm provides the data voltage Vdata; Md7 is turned on, I0 provides the initial voltage Vinit, so as to write Vinit into the anode of O0, so as to control O0 not to emit light, and remove the residual charge of the anode of O0;

At the beginning of the data writing-in phase ST2, Md3 is turned on to charge C0 with the data voltage Vdata, so as to increase the potential of the gate electrode of Md3 until Md3 is turned off. At this time, the potential of the gate electrode of Md3 is Vdata+Vth, wherein, Vth is the threshold voltage of Md3;

In the light-emitting phase ST3, both S(n) and S(n−1) provide high-voltage signals, NS(n) and E(n) provide low-voltage signals, Md5, Md3 and Md6 are all turned on, and Md6 drives O0 to emit light.

As shown in FIG. 24, the signal provided by NS(n) is the same as that provided by E(n), which can reduce the second conversion circuit, and only use the first driving circuit and the first conversion circuit to control the display, which is conducive to realizing the narrow frame.

In at least one embodiment of the nth row and the mth column of the pixel circuit shown in FIG. 23, the gate electrode of Md5 can also be replaced to be electrically connected to the (n+1)th stage of second driving signal output terminal E(n+1).

Optionally, the nth row and mth column of pixel circuit includes nth row and mth column of data writing-in circuit, the nth row and mth column of compensation control circuit, the nth row and the mth column of first reset circuit, the nth row and mth column of second reset circuit, the nth row and mth column of the first light emitting control circuit, the nth row and mth column of the second light emitting control circuit, the nth row and mth column of driving circuit, the nth row and the mth column of third energy storage circuit and in the nth row and the mth column of light emitting element; n is a positive integer less than or equal to N, and m is a positive integer less than or equal to M;

The nth row and mth column of data writing-in circuit is respectively electrically connected to the nth stage of first driving signal output terminal, the mth column of data line and the first terminal of the nth row and mth column of driving circuit, is configured to write the data voltage provided by the mth column of data line into the first terminal of the nth row and mth column of pixel circuit under the control of the nth stage of first driving signal provided by the nth driving signal output terminal;

The nth row and mth column of compensation control circuit is respectively connected to the nth stage of third driving signal output terminal, the control terminal of the nth row and mth column of driving circuit, and the second terminal of the nth row and mth column of driving circuit, and is used to control to connect the control terminal of the nth row and the mth column of driving circuit and the second terminal of the nth row and the mth column of the driving circuit;

The nth row and mth column of first reset circuit is electrically connected to the (n−1)th stage of third driving signal output terminal, the control terminal of the nth row and mth column of driving circuit and the first initial voltage terminal, is configured to write the first initial voltage provided by the first initial voltage terminal into the control terminal of the nth row and mth column of driving circuit under the control of the (n−1)th stage of third driving signal provided by the (n−1)th stage of third driving signal output terminal;

The the nth row and mth column of second reset circuit is electrically connected to the nth stage of first driving signal output terminal, the first electrode of the nth row and mth column of the light emitting element and the second initial voltage terminal, respectively, is configured to write the second initial voltage provided by the second initial voltage terminal into the first electrode of the nth row and mth column of the light-emitting element under the control of the nth stage of first driving signal;

The control terminal of the nth row and the mth column of the first light-emitting control circuit is electrically connected to the nth stage of second driving signal output terminal or the (n+1)th stage of second driving signal output terminal; the nth row and mth column of first light emitting control circuit is also electrically connected to the first level terminal and the first terminal of the nth row and mth column of driving circuit respectively, and is used to control to connect the first level terminal and the first terminal of the nth row and mth column of driving circuit under the control of the nth stage of second driving signal provided at the nth stage of second driving signal output terminal and the (n+1)th second driving signal provided by the (n+1)th second driving signal output terminal;

The the nth row and mth column of second light emitting control circuit is respectively connected to the nth stage of second driving signal output terminal, the second terminal of the nth row and mth column of driving circuit and the first electrode of the nth row and mth column of the light emitting element, and is used to control to connect the second terminal of the nth row and mth column of driving circuit and the first electrode of the nth row and mth column of light emitting element under the control of the nth stage of second driving signal;

The nth row and the mth column of driving circuit is used to generate a driving current under the control of the potential of the control terminal thereof;

The nth row and mth column of third energy storage circuit is respectively electrically connected to the control terminal of the nth row of mth column of driving circuit and the first level terminal, is used to store electric energy;

The second electrode of the nth row and mth column of the light-emitting element is electrically connected to the second level terminal.

Figure 25:
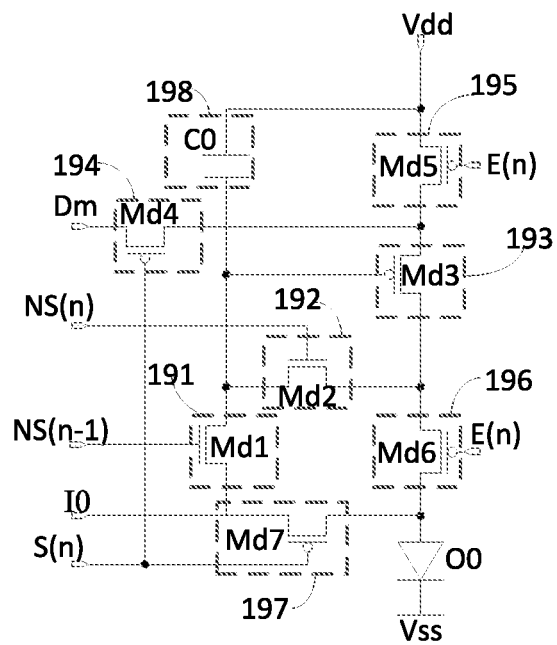
FIG. 25 is a circuit diagram of the nth row and the mth column of pixel circuit.

As shown in FIG. 25, the the nth row and mth column of first reset circuit 191 includes a first display control transistor Md1, the nth row and mth column of compensation control circuit 192 includes a second display control transistor Md2, and the nth row and mth column of driving circuit 193 includes a driving transistor Md3, the nth row and the mth column of data writing-in circuit 194 includes a fourth display control transistor Md4, the nth row and the mth column of the first light emitting control circuit 195 includes a fifth display control transistor Md5, and the nth row and the mth column of second light emitting control circuit 196 in the m column includes a sixth display control transistor Md6, and the nth row and m column of the second reset circuit 197 includes a seventh display control transistor Md7; the nth row and mth column of light emitting element is the nth row and mth column of organic light emitting diode O0; the nth row and mth column of third energy storage circuit 198 includes a storage capacitor C0;

The gate electrode of Md1 is electrically connected to the (n−1)th stage of third driving signal output terminal NS(n−1), the source electrode of Md1 is electrically connected to the initial voltage terminal I0, and the drain electrode of Md1 is electrically connected to the gate electrode of Md3;

The gate electrode of Md2 is electrically connected to the nth stage of third driving signal output terminal NS(n), the source electrode of Md2 is electrically connected to the gate electrode of Md3, and the drain electrode of Md2 is electrically connected to the drain electrode of Md3;

The gate electrode of Md4 is electrically connected to the nth stage of first driving signal output terminal S(n), the source electrode of Md4 is electrically connected to the mth column of data line Dm, and the drain electrode of Md4 is electrically connected to the source electrode of Md3;

The gate electrode of Md5 is electrically connected to the nth stage of second driving signal output terminal E(n), the source electrode of Md5 is electrically connected to the high level terminal Vdd, and the drain electrode of Md5 is electrically connected to the source electrode of Md3;

The gate electrode of Md6 is electrically connected to the nth stage of second driving signal output terminal E(n), the source electrode of Md6 is electrically connected to the drain electrode of Md3, the drain electrode of Md6 is electrically connected to the anode of O0; the cathode of O0 is electrically connected to the low voltage level terminal Vss;

The gate electrode of Md7 is electrically connected to the nth stage of first driving signal output terminal S(n), the source electrode of Md7 is electrically connected to the initial voltage terminal I0, and the drain electrode of Md7 is electrically connected to the drain electrode of Md6;

The first terminal of C0 is electrically connected to the high level terminal Vdd, and the second terminal of C0 is electrically connected to the gate electrode of Md3.

In at least one embodiment of the nth row and the mth column of the pixel circuit shown in FIG. 25, Md1 and Md2 are both NMOS transistors, and Md3, Md4, Md5, Md6 and Md7 are all PMOS transistors, but not limited thereto.

In at least one embodiment of the nth row and the mth column of the pixel circuit shown in FIG. 25, the gate electrode of Md5 can also be replaced to be electrically connected to the (n+1)th stage of second driving signal output terminal E(n+1).

Figure 26:
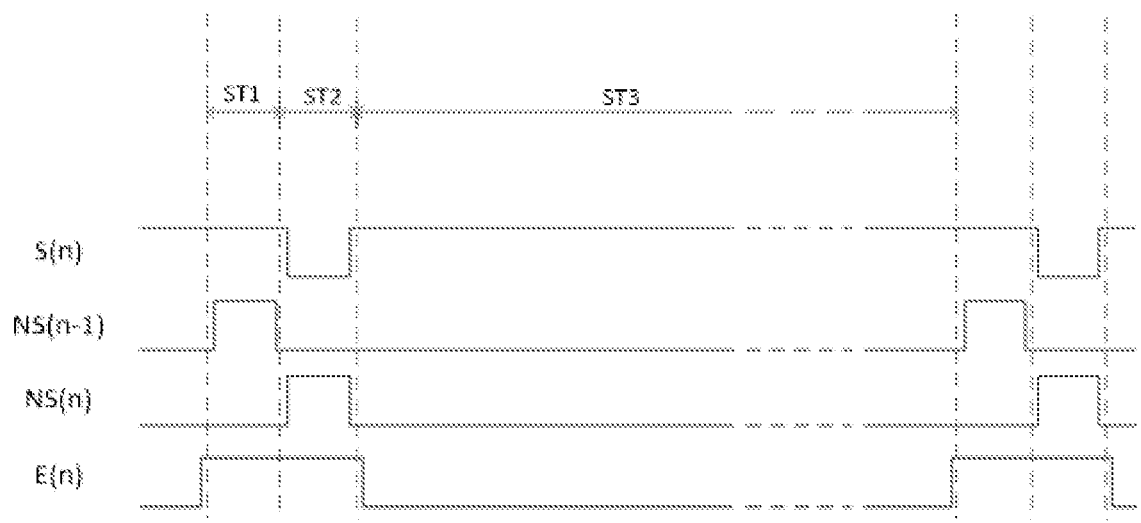
FIG. 26 is a work timing diagram of the nth row and the mth column of pixel circuit shown in FIG. 25.

As shown in FIG. 26, when at least one embodiment of the nth row and the mth column of the pixel circuit shown in FIG. 25 is in operation, the display period includes an initialization phase ST1, a data writing-in phase ST2 and a light emitting phase ST3 which are set successively;

In the initialization phase ST1, S(n) provides a high voltage signal, NS(n−1) provides a high voltage signal, NS(n) provides a low voltage signal, E(n) provides a high voltage signal, Md1 is turned on, and I0 provides an initial voltage Vinit, to write Vinit into the gate electrode of Md3, so that Md3 can be turned on when the data writing-in phase ST2 begins;

In the data writing-in phase ST2, S(n) provides a low voltage signal, NS(n−1) provides a low voltage signal, NS(n) provides a high voltage signal, E(n) provides a high voltage signal, M2 and M4 are turned on, Dm provides the data voltage Vdata, and controls to connect the gate electrode of Md3 and the drain electrode of Md3;

At the beginning of the data writing-in phase ST2, Md3 is turned on to charge C0 through Vdata to increase the potential of the gate electrode of Md3 until Md3 is turned off. At this time, the potential of the gate electrode of Md3 is Vdata+Vth, and Vth is the threshold voltage of Md3;

In the light emitting phase ST3, S(n) provides a high voltage signal, NS(n−1) provides a low voltage signal, NS(n) provides a low voltage signal, E(n) provides a low voltage signal, Md5, Md3 and Md6 are turned on, Md3 drives O0 to emit light.

The driving module described in at least one embodiment of the present disclosure includes a first driving circuit, a first conversion circuit, and a second conversion circuit, so as to be able to generate the first driving signal, the second driving signal, and the third driving signal without using a driving circuit for generating the second driving signal and a driving circuit for generating the third driving signal, which can reduce the number of transistors and facilitate the realization of the narrow frame.

Optionally, the nth row and mth column of pixel circuit includes nth row and mth column of data writing-in circuit, the nth row and mth column of compensation control circuit, the nth row and mth column of first reset circuit, the nth row and mth column of second reset circuit, the nth row and mth column of first light emitting control circuit, the nth row and mth column of second light emitting control circuit, the nth row and mth column of driving circuit, the nth row and the mth column of third energy storage circuit and the in the nth row and the mth column of light-emitting element; n is a positive integer less than or equal to N, and m is a positive integer less than or equal to M;

The nth row and mth column of data writing-in circuit is respectively electrically connected to the nth stage of first driving signal output terminal, the mth column of data line and the first terminal of the nth row and mth column of driving circuit, is configured to write the data voltage provided by the mth column of data line into the first terminal of the nth row and mth column of pixel circuit under the control of the nth stage of first driving signal provided by the nth driving signal output terminal;

The nth row and mth column of compensation control circuit is respectively connected to the nth stage of third driving signal output terminal, the control terminal of the nth row and mth column of driving circuit, and the second terminal of the nth row and mth column of driving circuit, and is used to control to connect the control terminal of the nth row and the mth column of driving circuit and the second terminals of the nth row and the mth column of the driving circuit under the control of the nth stage of third driving signal provided by the nth stage of third driving signal output terminal;

The nth row and mth column of first reset circuit is electrically connected to the (n−1)th stage of third driving signal output terminal, the control terminal of the nth row and mth column of driving circuit and the first initial voltage terminal, is configured to write the first initial voltage provided by the first initial voltage terminal into the control terminal of the nth row and mth column of the driving circuit under the control of the (n−1)th stage of third driving signal provided by the (n−1)th stage of third driving signal output terminal;

The nth row and mth column of second reset circuit is electrically connected to the nth stage of second driving signal output terminal, the first electrode of the nth row and mth column of light-emitting element and the second initial voltage terminal respectively, is configured to write the second initial voltage provided by the second initial voltage terminal into the first electrode of the nth row and mth column of light emitting element under the control of the nth stage of second driving signal provided by the nth stage of second driving signal output terminal;

The control terminal of the nth row and the mth column of the first light-emitting control circuit is electrically connected to the nth stage of second driving signal output terminal or the (n+1)th second driving signal output terminal; the nth row and mth column of first light emitting control circuit is also electrically connected to the first level terminal and the first terminal of nth row and mth column of the driving circuit respectively, and is configured to control to connect the first level terminal and the first terminal of the nth row and mth column of driving circuit under the control of the nth stage of second driving signal or the (n+1)th second driving signal provided by the (n+1)th second driving signal output terminal;

The nth row and mth column of second light emitting control circuit is respectively connected to the nth stage of second driving signal output terminal, the second terminal of the nth row and mth column of driving circuit and the first electrode of the nth row and mth column of the light emitting element, and is used to control to connect the second terminal of the nth row and mth column of driving circuit and the first electrode of the nth row and mth column of light emitting element under the control of the nth stage of second driving signal;

The nth row and the mth column of driving circuit is used to generate a driving current under the control of the potential of the control terminal thereof;

The nth row and mth column of third energy storage is electrically connected to the control terminal of the nth row and mth column of driving circuit and the first level terminal, is used store electric energy;

The second electrode of the nth row and mth column of the light-emitting element is electrically connected to the second level terminal.

Figure 27:
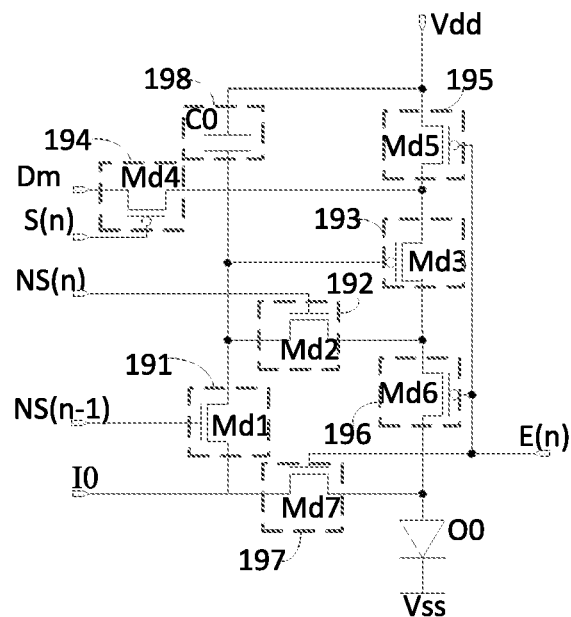
FIG. 27 is a circuit diagram the nth row and the mth column of pixel circuit.

As shown in FIG. 27, the nth row and mth column of first reset circuit 191 includes a first display control transistor Md1, and the nth row and mth column of compensation control circuit 192 includes a second display control transistor Md2, and the nth row and mth column of driving circuit 193 includes a driving transistor Md3, the nth row and the mth column of data writing-in circuit 194 includes a fourth display control transistor Md4, the nth row and the mth column of the first light emitting control circuit 195 includes a fifth display control transistor Md5, and the nth row and the mth column of second light emitting control circuit 196 includes a sixth display control transistor Md6, and the nth row and m column of second reset circuit 197 includes a seventh display control transistor Md7; the nth row and mth column of light emitting element includes the nth row and mth column of organic light emitting diode O0; the nth row and mth column of third energy storage circuit 198 includes a storage capacitor C0;

The gate electrode of Md1 is electrically connected to the (n−1)th stage of third driving signal output terminal NS(n−1), the source electrode of Md1 is electrically connected to the initial voltage terminal I0, and the drain electrode of Md1 is electrically connected to the gate electrode of Md3;

The gate electrode of Md2 is electrically connected to the nth stage of third driving signal output terminal NS(n), the source electrode of Md2 is electrically connected to the gate electrode of Md3, and the drain electrode of Md2 is electrically connected to the drain electrode of Md3;

The gate electrode of Md4 is electrically connected to the nth stage of first driving signal output terminal S(n), the source electrode of Md4 is electrically connected to the mth column of data line Dm, and the drain electrode of Md4 is electrically connected to the source electrode of Md3;

The gate electrode of Md5 is electrically connected to the nth stage of second driving signal output terminal E(n), the source electrode of Md5 is electrically connected to the high level terminal Vdd, and the drain electrode of Md5 is electrically connected to the source electrode of Md3;

The gate electrode of Md6 is electrically connected to the nth stage of second driving signal output terminal E(n), the source electrode of Md6 is electrically connected to the drain electrode of Md3, the drain electrode of Md6 is electrically connected to the anode of O0; the cathode of O0 is electrically connected to the low voltage level terminal Vss;

The gate electrode of Md7 is electrically connected to the nth stage of second driving signal output terminal E(n), the source electrode of Md7 is electrically connected to the initial voltage terminal I0, and the drain electrode of Md7 is electrically connected to the drain electrode of Md6;

The first terminal of C0 is electrically connected to the high level terminal Vdd, and the second terminal of C0 is electrically connected to the gate electrode of Md3.

In at least one embodiment of the nth row and the mth column of the pixel circuit shown in FIG. 27, Md1, Md2 and Md7 are all NMOS transistors, and Md3, Md4, Md5 and Md6 are all PMOS transistors, but not limited thereto.

In at least one embodiment of the nth row and the mth column of the pixel circuit shown in FIG. 27, the gate electrode of Md5 can also be replaced to be electrically connected to the (n+1)th stage of second driving signal output terminal E(n+1).

The driving module described in at least one embodiment of the present disclosure includes a first driving circuit, a first conversion circuit, and a second conversion circuit, so as to be able to generate the first driving signal, the second driving signal, and the third driving signal without using a driving circuit for generating the second driving signal and the driving circuit for generating the third driving signal, which can reduce the number of transistors and facilitate the realization of the narrow frame.

Figure 28:
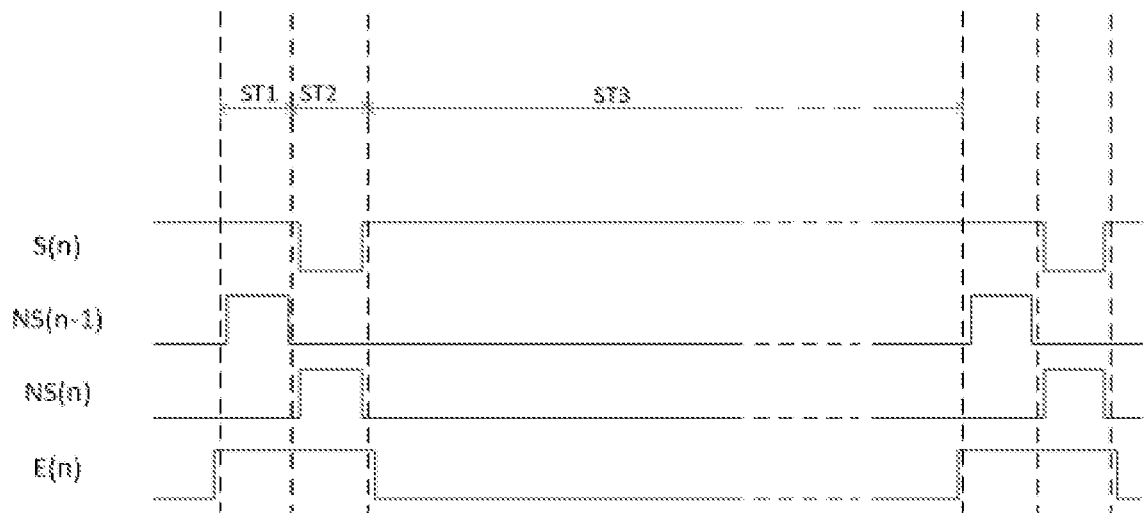
FIG. 28 is a work timing diagram of the nth row and the mth column of the pixel circuit shown in FIG. 27.

As shown in FIG. 28, when at least one embodiment of the nth row and the mth column of the pixel circuit shown in FIG. 27 is in operation, the display period includes an initialization phase ST1, a data writing-in phase ST2 and a light emitting phase ST3 which are set successively;

In the initialization phase ST1, S(n) provides a high voltage signal, NS(n−1) provides a high voltage signal, NS(n) provides a low voltage signal, E(n) provides a high voltage signal, Md1 is turned on, and I0 provides an initial Voltage Vinit, to write Vinit into the gate electrode of Md3, so that Md3 can be turned on when the data writing-in phase ST2 begins;

In the data writing-in phase ST2, S(n) provides a low voltage signal, NS(n−1) provides a low voltage signal, NS(n) provides a high voltage signal, E(n) provides a high voltage signal, M2 and M4 are turned on, Dm provides the data voltage Vdata, and controls to connect the gate electrode of Md3 and the drain electrode of Md3;

At the beginning of the data writing-in phase ST2, Md3 is turned on to charge C0 through Vdata to increase the potential of the gate electrode of Md3 until Md3 is turned off. At this time, the potential of the gate electrode of Md3 is Vdata+Vth, and Vth is the threshold voltage of Md3;

In the light emitting phase ST3, S(n) provides a high voltage signal, NS(n−1) provides a low voltage signal, NS(n) provides a low voltage signal, E(n) provides a low voltage signal, Md5, Md3 and Md6 are turned on, Md3 drives O0 to emit light.

The display device described in the embodiment of the present disclosure includes the above-mentioned display substrate.

The display device provided by the embodiments of the present disclosure may be any product or component with a display function, such as a mobile phone, a tablet computer, a television, a monitor, a notebook computer, a digital photo frame, a navigator, and the like.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A driving module, comprising a first driving circuit and a first conversion circuit; wherein n is a positive integer; the first driving circuit includes a plurality of stages of first driving sub-circuits; the first conversion circuit includes a plurality of first conversion sub-circuits;

an nth stage of first driving sub-circuit is configured to generate and output an nth stage of first driving signal through an nth stage of first driving signal output terminal;

an (n−1)th stage of first driving sub-circuit is configured to generate and output an (n−1)th stage of first driving signal through an (n−1)th stage of first driving signal output terminal;

an nth first conversion sub-circuit is respectively electrically connected to the (n−1)th stage of first driving signal output terminal, the nth stage of first driving signal output terminal, and a first voltage terminal, a second voltage terminal and an nth stage of second driving signal output terminal, and is configured to control the nth stage of second driving signal output terminal to output an nth stage of second driving signal under the control of the (n−1)th stage of first driving signal and the nth stage of first driving signal according to a first voltage signal provided by the first voltage terminal and a second voltage signal provided by the second voltage terminal;

the driving module further comprising a second conversion circuit; wherein the second conversion circuit includes a plurality of second conversion sub-circuits;

an (n−1)th second conversion sub-circuit is respectively electrically connected to the (n−1)th stage of first driving signal output terminal and the nth stage of first driving signal output terminal, the nth stage of second driving signal output terminal, a third voltage terminal, a fourth voltage terminal and an (n−1)th stage of third driving signal output terminal, is configured to control the (n−1)th stage of third driving signal output terminal to output an (n−1)th stage of third driving signal under the control of the (n−1)th stage of first driving signal, the nth stage of first driving signal and the nth stage of second driving signal, according to a third voltage signal provided by the third voltage terminal and a fourth voltage signal provided by the fourth voltage terminal.

2. The driving module according to claim 1, wherein the (n−1)th second conversion sub-circuit may include an (n−1)

th third conversion module, an (n−1)th fourth conversion module and an (n−1)th fifth conversion module;

the (n−1)th third conversion module is respectively electrically connected to the (n−1)th stage of first driving signal output terminal, the third voltage terminal and the (n−1)th stage of third driving signal output terminal, is configured to output the third voltage signal provided by the third voltage terminal to the (n−1)th stage of third driving signal output terminal under the control of the (n−1)th stage of first driving signal;

the (n−1)th fourth conversion module is respectively electrically connected to the nth stage of first driving signal output terminal, the fourth voltage terminal and the (n−1)th stage of third driving signal output terminal, is configured to output a fourth voltage signal provided by the fourth voltage terminal to the (n−1)th stage of third driving signal output terminal under the control of the nth stage of first driving signal;

the (n−1)th fifth conversion module is respectively electrically connected to the nth stage of second driving signal output terminal, the fourth voltage terminal and of the (n−1)th stage of third driving signal output terminal, is configured to output a fourth voltage signal provided by the fourth voltage terminal to the (n−1)th stage of third driving signal output terminal under the control of the nth stage of second driving signal.

3. The driving module according to claim 2, wherein the (n−1)th third conversion module includes a fifth transistor, the (n−1)th fourth conversion module includes a sixth transistor, and the (n−1)th fifth conversion module includes a seventh transistor;

a control electrode of the fifth transistor is electrically connected to the (n−1)th stage of first driving signal output terminal, a first electrode of the fifth transistor is electrically connected to the third voltage terminal, and a second electrode of the fifth transistor is electrically connected to the (n−1)th stage of third driving signal output terminal;

a control electrode of the sixth transistor is electrically connected to the nth stage of first driving signal output terminal, a first electrode of the sixth transistor is electrically connected to the fourth voltage terminal, and a second electrode of the sixth transistor is electrically connected to the (n−1)th stage of third driving signal output terminal;

a control electrode of the seventh transistor is electrically connected to the nth stage of second driving signal output terminal, a first electrode of the seventh transistor is electrically connected to the fourth voltage terminal, and a second electrode of the seventh transistor is electrically connected to the (n−1)th stage of third driving signal output terminal.

4. The driving module according to claim 3, wherein the fifth transistor and the seventh transistor are transistors of a first type, and the sixth transistor is a transistor of a second type.

5. The driving module according to claim 1, wherein the nth first conversion sub-circuit comprises an nth first conversion module and an nth second conversion module;

the nth first conversion module is respectively electrically connected to the (n−1)th stage of first driving signal output terminal, the nth stage of first driving signal output terminal, the first voltage terminal and the nth stage of second driving signal output terminal, and is configured to control to output the first voltage signal provided by the first voltage terminal to the nth stage of second driving signal output terminal under the control of the (n−1)th stage of first driving signal, and output the first voltage signal to the nth stage of second driving signal output terminal under the control of the nth stage of first driving signal;

the nth second conversion module is respectively electrically connected to the (n−1)th stage of first driving signal output terminal, the nth stage of first driving signal output terminal, the second voltage terminal and the nth stage of second driving signal output terminal, and is configured to output the second voltage signal provided by the second voltage terminal to the nth stage of second driving signal output terminal under the control of the (n−1)th stage of first driving signal and the nth stage of first driving signal.

6. The driving module according to claim 5, wherein the nth first conversion module includes a first transistor and a second transistor, and the nth second conversion module includes a third transistor and a fourth transistor;

a control electrode of the first transistor is electrically connected to the (n−1)th stage of first driving signal output terminal, a first electrode of the first transistor is electrically connected to the first voltage terminal, and a second electrode of the first transistor is electrically connected to the nth stage of second driving signal output terminal;

a control electrode of the second transistor is electrically connected to the nth stage of first driving signal output terminal, a first electrode of the second transistor is electrically connected to the first voltage terminal, and a second electrode of the second transistor is electrically connected to the nth stage of second driving signal output terminal;

a control electrode of the third transistor is electrically connected to the (n−1)th stage of first driving signal output terminal, a first electrode of the third transistor is electrically connected to the second voltage terminal, and a second electrode of the third transistor is electrically connected to the nth stage of second driving signal output terminal;

a control electrode of the fourth transistor is electrically connected to the nth stage of first driving signal output terminal, a first electrode of the fourth transistor is electrically connected to the second electrode of the third transistor, and a second electrode of the fourth transistor is electrically connected to the nth stage of second driving signal output terminal.

7. The driving module according to claim 6, wherein both the first transistor and the second transistor are transistors of a first type, and the third transistor and the fourth transistor are both transistors of a second type.

8. The driving module according to claim 1, wherein the nth stage of first driving sub-circuit includes a first node control circuit, a control node control circuit, a second node control circuit, a first energy storage circuit, a second energy storage circuit and an output circuit, wherein, the first node control circuit is electrically connected to a control clock signal terminal, a sixth voltage terminal, a first node and a control node respectively, and is configured to control to write a sixth voltage signal provided by the sixth voltage terminal into the first node under the control of a control clock signal provided by the control clock signal terminal, and write the control clock signal provided by the control clock signal terminal into the first node under the control of a potential of the control node;

the control node control circuit is electrically connected to the control clock signal terminal, an input terminal, the control node, the first node, an output clock signal terminal and a fifth voltage terminal respectively, is configured to write an input signal provided by the input terminal into the control node under the control of the control clock signal, and write a fifth voltage signal provided by the fifth voltage terminal into the control node under the control of a potential of the first node and an output control signal provided by the output control clock signal terminal;

the second node control circuit is electrically connected to the sixth voltage terminal, the control node, and a second node, respectively, is configured to control to connect the control node and the second node under the control of a sixth voltage signal provided by the sixth voltage terminal;

a first terminal of the first energy storage circuit is electrically connected to the second node, and a second terminal of the first energy storage circuit is connected to the nth stage of first driving signal output terminal; the first energy storage circuit is used to store electrical energy;

a first terminal of the second energy storage circuit is electrically connected to the first node, a second terminal of the second energy storage circuit is electrically connected to the fifth voltage terminal, and the second energy storage circuit is used to store electric energy;

the output circuit is respectively connected to the first node, the second node, the output clock signal terminal, the fifth voltage terminal and the nth stage of first driving signal output terminal, is configured to output the fifth voltage signal provided by the fifth voltage terminal to the nth stage of first driving signal output terminal under the control of the potential of the first node, and output the output clock signal to the nth stage of first driving signal output terminal under the control of the potential of the second node.

9. The driving module according to claim 8, wherein the first node control circuit comprises a first control transistor and a second control transistor;

a control electrode of the first control transistor is electrically connected to the control clock signal terminal, a first electrode of the first control transistor is electrically connected to the sixth voltage terminal, and a second electrode of the first control transistor is electrically connected to the first node;

a control electrode of the second control transistor is electrically connected to the control node, a first electrode of the second control transistor is electrically connected to the control clock signal terminal, and a second electrode of the second control transistor is electrically connected to the first node;

the control node control circuit includes a third control transistor, a fourth control transistor and a fifth control transistor;

a control electrode of the third control transistor is electrically connected to the control clock signal terminal, a first electrode of the third control transistor is electrically connected to the input terminal, and a second electrode of the third control transistor is electrically connected to the control node;

a control electrode of the fourth control transistor is electrically connected to the first node, and a first electrode of the fourth control transistor is electrically connected to the fifth voltage terminal;

a control electrode of the fifth control transistor is electrically connected to the output clock signal terminal, a first electrode of the fifth control transistor is electrically connected to the second electrode of the fourth control transistor, and a second electrode of the fifth control transistor is electrically connected to the control node;

the second node control circuit includes a sixth control transistor;

a control electrode of the sixth control transistor is electrically connected to the sixth voltage terminal, a first electrode of the sixth control transistor is electrically connected to the control node, and a second electrode of the sixth control transistor is electrically connected to the second node;

the first energy storage circuit includes a first capacitor, and the second energy storage circuit includes a second capacitor;

a first terminal of the first capacitor is electrically connected to the second node, and a second terminal of the first capacitor is electrically connected to the nth stage of first driving signal output terminal;

a first terminal of the second capacitor is electrically connected to the first node, and a second terminal of the second capacitor is electrically connected to the fifth voltage terminal;

the output circuit includes a first output transistor and a second output transistor;

a control electrode of the first output transistor is electrically connected to the first node, a first electrode of the first output transistor is electrically connected to the fifth voltage terminal, and a second electrode of the first output transistor is electrically connected to the nth stage of first driving signal output terminal;

a control electrode of the second output transistor is electrically connected to the second node, a first electrode of the second output transistor is electrically connected to the nth stage of first driving signal output terminal, and a second electrode of the second output transistor is electrically connected to the output clock signal terminal.

10. A display panel, comprising the driving module according to claim 1 arranged in a peripheral area and N rows and M columns of pixel circuits arranged in a display area; N and M are positive integers;

the driving module is used to provide driving signals for the pixel circuits.

11. The display panel according to claim 10, wherein the driving signal comprises a first driving signal and a second driving signal;

the first driving circuit included in the driving module is arranged on a side of the first conversion circuit included in the driving module away from the display area.

12. The display panel according to claim 11, wherein the driving signal further comprises a third driving signal; the driving module further comprises a second conversion circuit;

the second conversion circuit is arranged on a side of the first conversion circuit close to the display area.

13. The display panel according to claim 10, wherein an nth row and mth column of pixel circuit includes an nth row and mth column of data writing-in circuit, an nth row and mth column of compensation control circuit, an nth row and mth column of first reset circuit, an nth row and mth column of second reset circuit, an nth row and mth column of a first light emitting control circuit, an nth row and mth column of second light emitting control circuit, an nth row and mth column of driving circuit, an nth row and mth column of third energy storage circuit and an nth row and the mth column of light-emitting element; n is a positive integer less than or equal to N, and m is a positive integer less than or equal to M;

the nth row and mth column of data writing-in circuit is respectively electrically connected to the nth stage of first driving signal output terminal, an mth column of data line and a first terminal of the nth row and mth column of driving circuit, is configured to write a data voltage provided by the mth column of data line into the first terminal of the nth row and mth column of pixel circuit under the control of the nth stage of first driving signal provided by the nth driving signal output terminal;

the nth row and mth column of compensation control circuit is respectively connected to the nth stage of first driving signal output terminal, a control terminal of the nth row and mth column of driving circuit, and a second terminal of the nth row and mth column of driving circuit, and is configured to control to connect the control terminal of the nth row and mth column of driving circuit and the second terminal of the nth row and mth column of driving circuit under the control of the nth stage of first driving signal;

the nth row and the mth column of first reset circuit in is electrically connected to the (n−1)th stage of first driving signal output terminal, the control terminal of the nth row and the mth column of driving circuit and a first initial voltage terminal, is configured to write a first initial voltage provided by the first initial voltage terminal into the control terminal of the nth row and the mth column of the driving circuit under the control of the (n−1)th stage of first driving signal provided by the (n−1)th stage of first driving signal output terminal;

the nth row and mth column of second reset circuit is electrically connected to the nth stage of first driving signal output terminal, a first electrode of the nth row and mth column of the light emitting element and a second initial voltage terminal, respectively, is configured to write a second initial voltage provided by the second initial voltage terminal into the first electrode of the nth row and mth column of the light-emitting element under the control of the nth stage of first driving signal;

the control terminal of the nth row and the mth column of the first light-emitting control circuit is electrically connected to the nth stage of second driving signal output terminal or the (n+1)th second driving signal output terminal; the nth row and the mth column of the first light emitting control circuit is also electrically connected to the first level terminal and the first terminal of the nth row and mth column of driving circuit respectively, and is configured to connect the first level terminal and the first terminal of the nth row and mth column of driving circuit under the control of the nth stage of second driving signal provided by the nth stage of second driving signal output terminal or the (n+1)th second driving signal provided by the (n+1)th second driving signal output terminal;

the nth row and mth column of second light emitting control circuit is respectively connected to the nth stage of second driving signal output terminal, the second terminal of the nth row and mth column of driving circuit and the first electrode of the nth row and mth column of the light emitting element, and is used to control to connect the second terminal of the nth row and mth column of driving circuit and the first electrode of the nth row and mth column of the light emitting element under the control of the nth stage of second driving signal;

the nth row and the mth column of driving circuit is used to generate a driving current under the control of a potential of the control terminal of the nth row and the mth column of driving circuit;

the nth row and mth column of third energy storage circuit is electrically connected to the control terminal of the nth row and mth column of driving circuit and the first level terminal, is configured to store electric energy;

the second electrode of the nth row and mth column of the light emitting element is electrically connected to the second level terminal.

14. The display panel according to claim 10, wherein the nth row and mth column of pixel circuit includes an nth row and mth column of data writing-in circuit, an nth row and mth column of on-off control circuit, an nth row and mth column of compensation control circuit, an nth row and mth column of first reset circuit, an nth row and the mth column of the second reset circuit, an nth row and mth column of the first light emitting control circuit, an nth row and mth column of the second light emitting control circuit, an nth row and the mth column of driving circuit, an nth row and the mth column of third energy storage circuit and an nth row and the mth column of light emitting element; n is a positive integer less than or equal to N, and m is a positive integer less than or equal to M;

the nth row and mth column of data writing-in circuit is respectively electrically connected to the nth stage of first driving signal output terminal, an mth column of data line and a first terminal of the nth row and mth column of driving circuit, is configured to write a data voltage provided by the mth column of data line into the first terminal of the nth row and mth column of pixel circuit under the control of the nth stage of first driving signal provided by the nth driving signal output terminal;

the nth row and the mth column of on-off control circuit is respectively electrically connected to the nth stage of third driving signal output terminal, the control terminal of the nth row and the mth column of driving circuit and an nth row and the mth column of connection node, is configured to control to connect the control terminal of the nth row and mth column of driving circuit and the nth row and mth column of connection node under the control of the nth stage of third driving signal provided by the nth stage of third driving signal output terminal;

the nth row and mth column of compensation control circuit is respectively connected to the nth stage of first driving signal output terminal, the nth row and mth column of connection node and the second terminal of the nth row and mth column of driving circuit, is configured to control to connect the nth row and mth column of connection node and the second terminal of the nth row and mth column of driving circuit under the control of the nth stage of first driving signal;

the nth row and the mth column of first reset circuit is electrically connected to the (n−1)th stage of first driving signal output terminal, the nth row and the mth column of connection node and the first initial voltage terminal, and is configured to write a first initial voltage provided by the first initial voltage terminal into the nth row and mth column of connection node under the control of the (n−1)th stage of first driving signal provided by the (n−1)th stage of first driving signal output terminal;

the nth row and mth column of second reset circuit is electrically connected to the nth stage of first driving signal output terminal, the first electrode of the nth row and mth column of the light emitting element and a second initial voltage terminal, respectively, is configured to write a second initial voltage provided by the second initial voltage terminal into the first electrode of the nth row and mth column of light-emitting element under the control of the nth stage of first driving signal;

the control terminal of the nth row and the mth column of the first light-emitting control circuit is electrically connected to the nth stage of second driving signal output terminal or the (n+1)th second driving signal output terminal; the nth row and the mth column of first light emitting control circuit is also electrically connected to the first level terminal and the first terminal of the nth row and mth column of driving circuit respectively, and is configured to control to connect the first level terminal and the first terminal of the nth row and mth column of driving circuit under the control of the nth stage of second driving signal provided by the nth stage of second driving signal output terminal or the (n+1)th second driving signal provided by the (n+1)th second driving signal output terminal;

the nth row and mth column of second light emitting control circuit is respectively connected to the nth stage of second driving signal output terminal, the second terminal of the nth row and mth column of driving circuit and the first electrode of the nth row and mth column of the light emitting element, and is used to control to connect the second terminal of the nth row and mth column of driving circuit and the first electrode of the nth row and mth column of light emitting element under the control of the nth stage of second driving signal;

the nth row and the mth column of driving circuit is used to generate a driving current under the control of a potential of the control terminal of the nth row and the mth column of driving circuit;

the nth row and mth column of third energy storage circuit is electrically connected to the control terminal of the nth row and mth column of driving circuit and the first level terminal and is configured to store electric energy;

the second electrode of the nth row and the mth column of the light-emitting element is electrically connected to the second level terminal;

the nth stage of third driving signal output terminal and the nth stage of second driving signal output terminal are connected to a same driving signal.

15. The display panel according to claim 10, wherein the nth row and mth column of pixel circuit includes an nth row and mth column of data writing-in circuit, an nth row and mth column of compensation control circuit, an nth row and the mth column of first reset circuit, an nth row and mth column of second reset circuit, an nth row and mth column of the first light emitting control circuit, an nth row and mth column of the second light emitting control circuit, an nth row and mth column of driving circuit, an nth row and the mth column of third energy storage circuit and an nth row and the mth column of light emitting element; n is a positive integer less than or equal to N, and m is a positive integer less than or equal to M;

the nth row and mth column of data writing-in circuit is respectively electrically connected to the nth stage of first driving signal output terminal, an mth column of data line and the first terminal of the nth row and mth column of driving circuit, is configured to write a data voltage provided by the mth column of data line into the first terminal of the nth row and mth column of pixel circuit under the control of the nth stage of first driving signal provided by the nth driving signal output terminal;

the nth row and mth column of compensation control circuit is respectively connected to the nth stage of third driving signal output terminal, the control terminal of the nth row and mth column of driving circuit, and the second terminal of the nth row and mth column of driving circuit, and is used to control to connect the control terminal of the control terminal of the nth row and the mth column of driving circuit and the second terminal of the nth row and the mth column of the driving circuit under the control of the nth stage of third driving signal provided by the nth stage of third driving signal output terminal;

the nth row and mth column of first reset circuit is electrically connected to the (n−1)th stage of third driving signal output terminal, the control terminal of the nth row and mth column of driving circuit and the first initial voltage terminal, is configured to write the first initial voltage provided by the first initial voltage terminal into the control terminal of the nth row and mth column of driving circuit under the control of the (n−1)th stage of third driving signal provided by the (n−1)th stage of third driving signal output terminal;

the nth row and mth column of second reset circuit is electrically connected to the nth stage of first driving signal output terminal, the first electrode of the nth row and mth column of the light emitting element and a second initial voltage terminal, respectively, is configured to write a second initial voltage provided by the second initial voltage terminal into the first electrode of the nth row and mth column of the light-emitting element under the control of the nth stage of first driving signal;

the control terminal of the nth row and the mth column of the first light-emitting control circuit is electrically connected to the nth stage of second driving signal output terminal or the (n+1)th second driving signal output terminal; the nth row and mth column of first light emitting control circuit is also electrically connected to the first level terminal and the first terminal of the nth row and mth column of driving circuit respectively, and is used to control to connect the first level terminal and the first terminal of the nth row and mth column of driving circuit under the control of the nth stage of second driving signal provided by the nth stage of second driving signal output terminal or the (n+1)th second driving signal provided by the (n+1)th second driving signal output terminal;

the nth row and mth column of second light emitting control circuit is respectively connected to the nth stage of second driving signal output terminal, the second terminal of the nth row and mth column of driving circuit and the first electrode of the nth row and mth column of the light emitting element, and is used to control to connect the second terminal of the nth row and mth column of driving circuit and the first electrode of the nth row and mth column of light emitting element under the control of the nth stage of second driving signal;

the nth row and the mth column of driving circuit is used to generate a driving current under the control of a potential of the control terminal of the nth row and the mth column of driving circuit;

the nth row and mth column of third energy storage circuit is respectively electrically connected to the control terminal of the nth row of mth column of driving circuit and the first level terminal, is used to store electric energy;

the second electrode of the nth row and mth column of the light-emitting element is electrically connected to the second level terminal.

16. The display panel according to claim 10, wherein the nth row and mth column of pixel circuit includes an nth row and mth column of data writing-in circuit, an nth row and mth column of compensation control circuit, an nth row and mth column of first reset circuit, an nth row and mth column of second reset circuit, an nth row and mth column of first light emitting control circuit, an nth row and mth column of second light emitting control circuit, an nth row and mth column of driving circuit, an nth row and the mth column of third energy storage circuit and an nth row and the mth column of light-emitting element; n is a positive integer less than or equal to N, and m is a positive integer less than or equal to M;

the nth row and mth column of data writing-in circuit is respectively electrically connected to the nth stage of first driving signal output terminal, an mth column of data line and the first terminal of the nth row and mth column of driving circuit, is configured to write a data voltage provided by the mth column of data line into the first terminal of the nth row and mth column of pixel circuit under the control of the nth stage of first driving signal provided by the nth driving signal output terminal;

the nth row and mth column of compensation control circuit is respectively connected to the nth stage of third driving signal output terminal, the control terminal of the nth row and mth column of driving circuit, and the second terminal of the nth row and mth column of driving circuit, and is used to control to connect the control terminal of the nth row and the mth column of driving circuit and the second terminal of the nth row and the mth column of the driving circuit under the control of the nth stage of third driving signal provided by the nth stage of third driving signal output terminal;

the nth row and mth column of first reset circuit is electrically connected to the (n−1)th stage of third driving signal output terminal, the control terminal of the nth row and mth column of driving circuit and the first initial voltage terminal, is configured to write a first initial voltage provided by the first initial voltage terminal into the control terminal of the nth row and mth column of the driving circuit under the control of the (n−1)th stage of third driving signal provided by the (n−1)th stage of third driving signal output terminal;

the nth row and mth column of second reset circuit is electrically connected to the nth stage of second driving signal output terminal, the first electrode of the nth row and mth column of light-emitting element and a second initial voltage terminal respectively, is configured to write a second initial voltage provided by the second initial voltage terminal into the first electrode of the nth row and mth column of light emitting element under the control of the nth stage of second driving signal provided by the nth stage of second driving signal output terminal;

the control terminal of the nth row and the mth column of the first light-emitting control circuit is electrically connected to the nth stage of second driving signal output terminal or the (n+1)th second driving signal output terminal; the nth row and mth column of first light emitting control circuit is also electrically connected to the first level terminal and the first terminal of nth row and mth column of the driving circuit respectively, and is configured to control to connect the first level terminal and the first terminal of the nth row and mth column of driving circuit under the control of the nth stage of second driving signal or the (n+1)th second driving signal provided by the (n+1)th second driving signal output terminal;

the nth row and mth column of second light emitting control circuit is respectively connected to the nth stage of second driving signal output terminal, the second terminal of the nth row and mth column of driving circuit and the first electrode of the nth row and mth column of the light emitting element, and is used to control to connect the second terminal of the nth row and mth column of driving circuit and the first electrode of the nth row and mth column of light emitting element under the control of the nth stage of second driving signal;

the nth row and the mth column of driving circuit is used to generate a driving current under the control of a potential of the control terminal of the nth row and the mth column of driving circuit;

the nth row and mth column of third energy storage is electrically connected to the control terminal of the nth row and mth column of driving circuit and the first level terminal, is used store electric energy;

the second electrode of the nth row and mth column of the light-emitting element is electrically connected to the second level terminal.

17. A display device comprising the display panel according to claim 10.

18. The display device according to claim 17, wherein the driving signal comprises a first driving signal and a second driving signal;

the first driving circuit included in the driving module is arranged on a side of the first conversion circuit included in the driving module away from the display area.

19. The display device according to claim 18, wherein the driving signal further comprises a third driving signal; the driving module further comprises a second conversion circuit;

the second conversion circuit is arranged on a side of the first conversion circuit close to the display area.

* * * * *